(12) United States Patent
Chen et al.

(10) Patent No.: US 7,305,614 B2
(45) Date of Patent: Dec. 4, 2007

(54) INTEROPERABLE RETRIEVAL AND DEPOSIT USING ANNOTATED SCHEMA TO INTERFACE BETWEEN INDUSTRIAL DOCUMENT SPECIFICATION LANGUAGES

(75) Inventors: Shyh-Kwei Chen, Chappaqua, NY (US); Jih-Shyr Yih, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 09/907,240

(22) Filed: Jul. 17, 2001

(65) Prior Publication Data

US 2003/0018666 A1    Jan. 23, 2003

(51) Int. Cl.
G06N 3/00    (2006.01)
(52) U.S. Cl. ...................................... 715/513
(58) Field of Classification Search ............... 715/513, 715/517, 523, 530
See application file for complete search history.

(56) References Cited

U.S. PATENT DOCUMENTS

| | | | | |
|---|---|---|---|---|
| 5,173,853 | A * | 12/1992 | Kelly et al. ............... | 715/530 |
| 5,629,846 | A * | 5/1997 | Crapo ....................... | 708/705 |
| 5,745,908 | A * | 4/1998 | Anderson et al. .......... | 715/513 |
| 5,987,403 | A * | 11/1999 | Sugimura .................. | 704/2 |
| 6,119,137 | A * | 9/2000 | Smith et al. ............... | 715/523 |
| 6,393,442 | B1 * | 5/2002 | Cromarty et al. .......... | 715/523 |
| 6,442,577 | B1 * | 8/2002 | Britton et al. ............. | 715/513 |
| 6,569,207 | B1 * | 5/2003 | Sundaresan ................ | 715/513 |
| 6,684,369 | B1 * | 1/2004 | Bernardo et al. .......... | 715/513 |
| 6,687,878 | B1 * | 2/2004 | Eintracht et al. .......... | 715/512 |
| 6,691,279 | B2 * | 2/2004 | Yoden et al. .............. | 715/501.1 |
| 6,697,999 | B1 * | 2/2004 | Breuer et al. ............. | 715/517 |
| 2001/0039544 | A1 * | 11/2001 | Chakrabarti et al. ....... | 707/5 |
| 2002/0073119 | A1 * | 6/2002 | Richard ..................... | 707/513 |
| 2002/0095440 | A1 * | 7/2002 | Burgess et al. ............ | 707/513 |
| 2002/0099735 | A1 * | 7/2002 | Schroeder et al. ......... | 707/513 |
| 2002/0133387 | A1 * | 9/2002 | Wilson et al. ............. | 705/8 |
| 2002/0143823 | A1 * | 10/2002 | Stevens ..................... | 707/523 |
| 2002/0156811 | A1 * | 10/2002 | Krupa ....................... | 707/513 |
| 2002/0174145 | A1 * | 11/2002 | Duga et al. ................ | 707/513 |

(Continued)

OTHER PUBLICATIONS

Kotok, Alan, "XML and EDI Lessons Learned and Baggage to Leave Behind," Aug. 4, 1999, <http://www.xml.com/pub/a/1999/08/edi/index.html>, pp. 1-10.*

(Continued)

Primary Examiner—Stephen Hong
Assistant Examiner—Kyle R Stork
(74) Attorney, Agent, or Firm—Anne E. Barschall

(57) ABSTRACT

In order to achieve interoperability between diverse types of computer systems for the purpose of e-commerce, a system and method are provided for retrieving data from multiple relational databases into an XEDI document. First, a DTDSA is used to create an intermediate format for the data. Then, an annotated interoperable (universal) DTD is used to create the XEDI document. For depositing data from an XEDI document into multiple relational databases, a reverse process is used. The universal DTD is used to create the intermediate format. Then the DTDSA is used to create the relational database format. The deposit process requires analysis of join unions of data sought to be deposited, and also a static reversibility check for the DTDSA. A GUI interface is provided for generating annotations.

33 Claims, 28 Drawing Sheets

U.S. PATENT DOCUMENTS

2002/0184263 A1* 12/2002 Perinet et al. .............. 707/513
2003/0069975 A1* 4/2003 Abjanic et al. ............. 709/227
2003/0121000 A1* 6/2003 Cooper et al. .............. 715/513

OTHER PUBLICATIONS

Rein, Lisa, "XML '99: Quotes from the Conference Floor," Dec. 15, 1999, <http://www.xml.com/pub/a/1999/12xml99/quotes.html>, pp. 1-4.*

Sheth, Sonali, "Recursive DTD Query," Jul. 7, 1999, <http://chief.cs.uga.edu/~jam/qt4xml/sonali/thesis/thesis/node17.html>, p. 1.*

Malerba, Vivien, "Re: Notes on XML Queries proposal," May 12, 2000, <http://mail.gnome.org/archives/gnome-db-list/2000-May/msg00042.html>, pp. 1-2.*

Extol, Inc., "XML: To Be Or Not To Be", Jul. 3, 2000, pp. 1-23.*

"ANSI X12," <http://visidel.cau.edu/HECHI/Html/TrainingTool/stp004a.html>, pp. 1-4.*

"Building Oracle XML Applications", 2000, O'Reilly and Associates, Inc., Chapter 6, pp. 1-11.*

"Repository," <http://en.wikipedia.org/wiki/Repository>, p. 1.*

Hill et al., "Electronic Data Interchange: A Definition and Perspective," <http://marriottschools.byu.edu/teacher/MBA550/MBA585/EDI/EDI.htm>, pp. 1-8.*

Bray et al., "Extensible Markup Language (XML) 1.0," Feb. 10, 1998, <http://www.w3.org/TR/1998/REC-xml-19980210>, pp. 1-39.*

"ANSI X12," <http://visidel.cau.edu/HECHI/Html/TrainingTool/stp004a.html>, printed Apr. 28, 2005, pp. 1-4.*

"Repository," <http://en.wikipedia.org/wiki/Respository>, last updated Apr. 27, 2005, p. 1.*

Hill et al., "Electronic Data Interchange: A Definition and Perspective," <http://marriottschools.byu.edu/teacher/MBA550/MBA585/EDI/EDI.htm>, printed Apr. 28, 2005, pp. 1-8.*

"EDI and XML time for a dual approach?" 1998, <http://web.archive.org/web/19981205165458/http://inf2.pira.co.uk/top032.htm>, pp. 1-3.*

Ogbuji, "XML: The future of EDI?" 1999, <http://sunsite.uakom.sk/sunworldline/swol-02-1999/swol-02-xmledi.html>, pp. 1-9.* www.disa.org/Bookstore/Public/IntroPage.cfm?intCategory=2&intCArtID=0&intUserID, "Featured Products for X12 Standards" -summary.

www.x12.org/x12org/about/whatisedi.html, "What is EDI?".

www.x12.org/x12org/about/edifuture.htm, "Electronic Commerce on the Internet: The Future of EDI".

help.sap.com/saphelp_46csr2/helpdata/EN/dc/6b824843d711d1893e0000e8323c4f/conte . . . , "IDoc Structure", SAP Library.

www.unece.org/trade/untdid/texts/d422_d.htm, UN/EDIFACT Draft Directory, Part 4 United Nations Rules For Electronic Data Interchange For Administation, Commerce and Transport, Ch. 2.2.

"XML and EDI:Peaceful Co-Existence" by XML Solutions Corporation, xedi.org white paper.

* cited by examiner

```
<!DOCTYPE transactionSet [
                    200
                    ⌡
<!ELEMENT transactionSet (name, (loop|segment)*)>
<!ATTLIST transactionSet
        code CDATA #REQUIRED
        version CDATA #REQUIRED
        standard (X12 | EDIFACT) "X12"
>
                    210
                    ⌡
<!ELEMENT loop ((loop | segment)*)>
<!ATTLIST loop
        code CDATA #REQUIRED
>
                    220
                    ⌡
<!ELEMENT segment (name, element*)>
<!ATTLIST segment
        code CDATA #REQUIRED
>
                    230
                    ⌡
<!ELEMENT element (name, value)>
<!ATTLIST element
        code CDATA #REQUIRED
>
                    240
                    ⌡
<!ELEMENT name (#PCDATA)>
                    250
                    ⌡
<!ELEMENT value (#PCDATA)>
<!ATTLIST value
        code CDATA #REQUIRED
>
]>
```

FIG.2C

```
<!DOCTYPE transactionSet [
            450                              460
<!ELEMENT transactionSet (name:: w:=<getDocumentType(in1)>,
         loop::p:=<x.code>|segment::p:=<x.code>) :x.choice*
         ::x:=SQL("SELECT" FROM EDI WHERE map='$in1'
         ORDER BY pos"))>::dummy:=<initValue(in0)>      456
<!ATTLIST transactionSet                              458
     code CDATA #REQUIRED: getDocumentNumber(in1)
     version CDATA #REQUIRED:"004010"       459
     standard (X12 | EDIFACT) "X12"
>
     451                    457
<!ELEMENT loop ((loop::p:=<concat(p,"@", x.code)> |
         segment::p:=<concat(p,"@", x.code)>): x.choice*
         ::x:=SQL("SELECT" FROM EDI WHERE map='$x.code'
         ORDER BY pos"))>
<!ATTLIST loop
     code CDATA #REQUIRED: x.name
>
     452
<!ELEMENT segment (name::w:=<x.name>,
     element*::y:=row(EDI, <map>, <x.code>))>
<!ATTLIST segment
     code CDATA #REQUIRED: x.code
>
     453
<!ELEMENT element (name::w.=<y.name>, value)>
<!ATTLIST element
     code CDATA #REQUIRED: y.code
>
     454
<!ELEMENT name (#PCDATA:w)>
     455                    474
<!ELEMENT value (#PCDATA: value4Element(val, y.code, y.type)>
     ::val:=<getEDI Value(y.code, p)>
                                   470
<!ATTLIST value
     code CDATA #IMPLIED:id4Element(val, y.type)
>                                  472
]>
```

FIG.4C

| MAP 500 | CODE 502 | POS 504 | CHOICE 506 | TYPE 508 | NAME 510 |
|---|---|---|---|---|---|
| TS850 | ST | 0010 | SEGMENT | | TRANSACTION SET HEADER |
| TS850 | BEG | 0020 | SEGMENT | | BEGINNING SEGMENT FOR PO |
| TS850 | REF | 0050 | SEGMENT | | REFERENCE NUMBERS |
| TS850 | LOOP_N1 | 0301 | LOOP | | N1 |
| TS850 | LOOP_PO1 | 1010 | LOOP | | PO1 |
| TS850 | CTT | 2010 | SEGMENT | | TRANSACTION TOTALS |
| TS850 | SE | 2030 | SEGMENT | | TRANSACTION SET TRAILER |
| LOOP_N1 | N1 | 0310 | SEGMENT | | NAME |
| LOOP_N1 | N2 | 0320 | SEGMENT | | ADDITIONAL NAME INFORMATION |
| LOOP_N1 | N3 | 0330 | SEGMENT | | ADDRESS INFORMATION |
| LOOP_N1 | N4 | 0340 | SEGMENT | | GEOGRAPHIC LOCATION |
| LOOP_PO1 | PO1 | 1010 | SEGMENT | | BASELINE ITEM DATA |
| LOOP_PO1 | LOOP_PID | 1050 | LOOP | | PID |
| LOOP_PID | PID | 1050 | SEGMENT | | PRODUCT/ITEM DESCRIPTION |
| ST | 143 | | ELEMENT | ID | TRANSACTION SET ID CODE |
| ST | 329 | | ELEMENT | AN | TRANSACTION SET CONTROL NUMBER |
| N1 | 98 | | ELEMENT | ID | ENTITY IDENTIFIER CODE |
| N1 | 93 | | ELEMENT | AN | NAME |
| N1 | 66 | | ELEMENT | ID | ID CODE QUALIFIER |
| N1 | 67 | | ELEMENT | AN | ID CODE |

FIG.5A

| Element ID 520 | Code 522 | Value 524 |
|---|---|---|
| 143 | 810 | X12 INVOICE |
| 143 | 850 | X12 PURCHASE ORDER |
| 98 | BT | BILL-TO-PARTY |
| 98 | BY | BUYING PARTY |
| 98 | SE | SELLING PARTY |
| 98 | ST | SHIP TO |
| 66 | 1 | D-U-N-S NUMBER, DUN & BRADSTREET |
| 66 | 8 | VENDOR UPS CODE |
| 66 | 9 | D-U-N-S+4, D-U-N-S NUMBER WITH 4 CHARACTER SUFFIX |
| 66 | 92 | ASSIGNED BY BUYER OR BUYER'S AGENT |

| LEVEL | SEGMENT ELEMENT/CODE | REPEAT | ANNOTATION | DESCRIPTION | LABEL |
|---|---|---|---|---|---|
| 1 | ST | | x:=row(PO, poid, in0) | TRANSACTION SET HEADER | ST |
| 2 | ST01/143 | | "850" | ID CODE | ST@143 |
| 2 | ST02/329 | | in0 | CONTROL NUMBER | ST@329 |
| 1 | LOOP_N1 | * | y:=row(company, coid, x.buyer) | N1/BUYER | LOOP_N1 |
| 2 | N1 | | | NAME | LOOP_N1@N1 |
| 3 | N101/98 | | "BY" | ENTITY ID | LOOP_N1@N1@98 |
| 3 | N102/93 | | y.name | NAME | LOOP_N1@N1@93 |
| 2 | N4 | | | GEOGRAPHIC LOCATION | LOOP_N1@N4 |
| 3 | N402/156 | | y.addr. | STATE | LOOP_N1@N4@156 |
| 1 | LOOP_N1 | * | y:=row(company, coid, x.seller) | N1/SELLER | LOOP_N1 |
| 2 | N1 | | | NAME | LOOP_N1@N1 |
| 3 | N101/98 | | "SE" | ENTITY ID | LOOP_N1@N1@98 |
| 3 | N102/93 | | y.name | NAME | LOOP_N1@N1@93 |
| 2 | N4 | | | GEOGRAPHIC LOCATION | LOOP_N1@N4 |
| 3 | N402/156 | | y.addr. | STATE | LOOP_N1@N4@156 |
| 1 | LOOP_P01 | * | z:=row(lineitem, poid, in0) | P01/LINE ITEM INFO | LOOP_P01 |
| 2 | P01 | | | BASE LINE ITEM | LOOP_P01@P01 |
| 3 | P0101/350 | | z.prodid | ID | LOOP_P01@P01@350 |
| 3 | P0102/330 | | "1" | QUANTITY | LOOP_P01@P01@330 |

| 627 | | | | |
|---|---|---|---|---|
| 3 | PO104/212 | | z.amount | UNIT PRICE | LOOP_PO1@PO1@212 |
| 2 | LOOP_PID | * | w:=row(product, prodid, z.prodid) 643 | PID/DESCRIPTION | LOOP_PO1@LOOP_PID |
| 3 | PID | | | PRODUCT/ITEM DESCRIPTION | LOOP_PO1@LOOP_PID@PID |
| 4 | PID01/349 | | 644 "F" | ITEM DESCRIPTION TYPE | LOOP_PO1@LOOP_PID@PID @349 |
| 4 | PID05/352 | | w.name | DESCRIPTION | LOOP_PO1@LOOP_PID@PID @352 |

428

```
                    ┌─ 880
        (ST@143, "850")
        (ST@329, "100")                    ┌─────────────────────────────┐
                    └─ 885    ┌─ 890       │ PARAMETER 0 (in0)="TS850"   │
886 ┐  ┌─ ─ ─ ─ ─ ─ ─ ─ ─ ─ ─ ─┐           │ PARAMETER 1 (in1)="100"     │
    └──│ (LOOP_N1@N1@98, "BY")  │          └─────────────────────────────┘
       │ (LOOP_N1@N1@93, "AT&T")│                              └ 899
       │ (LOOP_N1@N4@156, "NJ") │
       └─ ─ ─ ─ ─ ─ ─ ─ ─ ─ ─ ─┘
                    ┌─ 892
887 ┐  ┌─ ─ ─ ─ ─ ─ ─ ─ ─ ─ ─ ─┐
    └──│ (LOOP_N1@N1@98, "SE")  │
       │ (LOOP_N1@N1@93, "IBM") │
       │ (LOOP_N1@N4@156, "NY") │
       └─ ─ ─ ─ ─ ─ ─ ─ ─ ─ ─ ─┘
                    ┌─ 895
888 ┐  ┌─ ─ ─ ─ ─ ─ ─ ─ ─ ─ ─ ─ ─ ─ ─ ─ ─ ─ ─ ─ ─ ─┐
    └──│ (LOOP_P01@P01@350, "35768")                │
       │ (LOOP_P01@P01@330, "1")                    │
       │ (LOOP_P01@P01@212, "20K")                  │
       │ (LOOP_P01@LOOP_PID@349, "F")               │
       │ (LOOP_P01@LOOP_PID@PID@352, "THINKPAD")    │
       └─ ─ ─ ─ ─ ─ ─ ─ ─ ─ ─ ─ ─ ─ ─ ─ ─ ─ ─ ─ ─ ─┘
                    ┌─ 896
889 ┐  ┌─ ─ ─ ─ ─ ─ ─ ─ ─ ─ ─ ─ ─ ─ ─ ─ ─ ─ ─ ─ ─ ─┐
    └──│ (LOOP_P01@P01@350, "35694")                │
       │ (LOOP_P01@P01@330, "1")                    │
       │ (LOOP_P01@P01@212, "100K")                 │
       │ (LOOP_P01@LOOP_PID@349, "F")               │
       │ (LOOP_P01@LOOP_PID@PID@352, "SERVER")      │
       └─ ─ ─ ─ ─ ─ ─ ─ ─ ─ ─ ─ ─ ─ ─ ─ ─ ─ ─ ─ ─ ─┘
```

FIG.8B

```
<transactionSet code='850' version='004010' standard='X12'>
<name>Purchase Order</name>

<segment code='ST'>
    *for header*— 800
</segment>
<loop code='N1'>
    *for buyer*— 802
</loop>
<loop code='N1'>
    *for seller*— 804
</loop>
<loop code='P01'>
    *first line item*— 806
</loop>
<loop code='P01'>
    *second line item*— 808
</loop>
</transactionSet>
```

FIG.8C

```
<segment code='ST'>         650
    <name>Transaction Set Header</name>
                        651
    <element code='143'>
                    652
        <name>ID Code</name>
        <value code='850'>X12Purchase Order</value>
    </element>
    </element code='329'>
        <name>Control Number</name>
        <value>100</value>
    </element>     899
</segment>
```

```
<loop code='N1'>
    <segment code='N1'>
        <name>Name</name>
        <element code='98'>
            <name>Entity ID</name>         ─ 922
            <value code='SE'>Selling Party</value>
        </element>                         ─ 920
        <element code='93'>
            <name>Name</name>
            <value>IBM</value>
        </element>
    </segment>
    <segment code='N4'>
        <name>Geographic Location</name>
        <element code='156'>
            <name>State</name>
            <value>NY</value>
        </element>
    </segment>
</loop>
```
804

```
<loop code='N1'>
    <segment code='N1'>
        <name>Name</name>
        <element code='98'>
            <name>Entity ID</name>         ─ 912
            <value code='BY'>Buying Party</value>
        </element>                         ─ 910
        <element code='93'>
            <name>Name</name>
            <value>AT&T</value>
        </element>
    </segment>
    <segment code='N4'>
        <name>Geographic Location</name>
        <element code='156'>
            <name>State</name>
            <value>NJ</value>
        </element>
    </segment>
</loop>
```
802

```
<loop code='P01'>
  <segment code='P01'>
    <name>Base Line Item</name>
    <element code='350'>
      <name>ID</name>
      <value>35768</value>  935
    </element>
    <element code='330'>
      <name>Quantity</name>
      <value>1</value>
    </element>
    <element code='212'>
      <name>Unit Price</name>
      <value>20K</value>
    </element>
  </segment>
```

```
<loop code='P01'>
  <segment code='P01'>
    <name>Base Line Item</name>
    <element code='350'>
      <name>ID</name>
      <value>35694</value>  945
    </element>
    <element code='330'>
      <name>Quantity</name>
      <value>1</value>
    </element>
    <element code='212'>
      <name>Unit Price</name>
      <value>100K</value>
    </element>
  </segment>
```

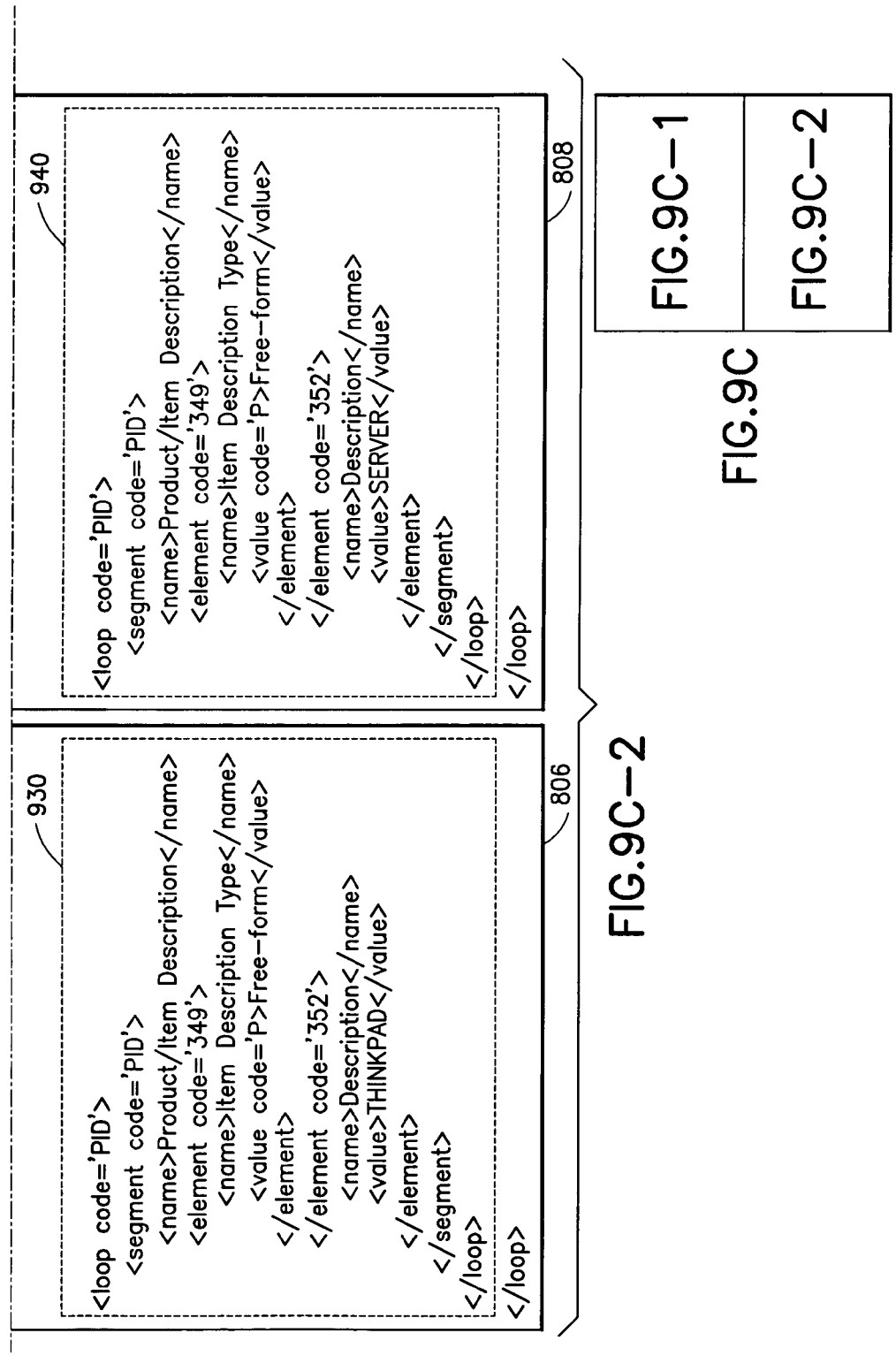

```
1020 —<!DOCTYPE BUYERS [          1000   1005
      <!ELEMENT BUYERS(buyer)*  ::r:=row (buyers)>
1021—                                    1030
      <!ELEMENTbuyer (ID, name, address, itemname, buyDate)>
              1035                                            1010
         :: x:=row(company, <coid>, <field(buyers, buyerid, r)>)
1022—                                                    1006
      <!ELEMENT ID(#PCDATA: field(buyers, buyerid, r))>
1023—                                        1007
      <!ELEMENT name(#PCDATA: field(company, name, x))>
1024—                                           1011
      <!ELEMENT address(#PCDATA: field(company, addr, x))>
1025—                                              1012
      <!ELEMENT itemname(#PCDATA: field(buyers, itemname, r))>
1026—                                                  1008
      <!ELEMENT buyDate(#PCDATA: field(buyers, buyday, r))>
            ]>         1040                         1009
```

FIG. 10A

```
<BUYERS>
    <buyer>
        <ID>1</ID>                              ─1055
        <name>IBM</name>                        ─1056
        <address>NY</address>                   ─1057
        <itemname>copy machine</itemname>       ─1058
        <buyDate>07/04/2000<buyDate>            ─1059
    </buyer>

<buyer>
        <ID>2</ID>
        <name>HP</name>
        <address>CA</address>
        <itemname>smart card</itemname>
        <buyDate>12/25/2000<buyDate>
    </buyer>
</BUYERS>
```

FIG.10B

INTEROPERABLE RETRIEVAL AND DEPOSIT USING ANNOTATED SCHEMA TO INTERFACE BETWEEN INDUSTRIAL DOCUMENT SPECIFICATION LANGUAGES

RELATED APPLICATIONS

The present application is related to the following other applications, both of which are incorporated herein by reference:
U.S. application Ser. No. 09/466,627 filed Dec. 17, 1999; and
U.S. application Ser. No. 09/689,377 filed Oct. 12, 2000.

BACKGROUND OF THE INVENTION

1. Field of the Invention

The invention relates to the field of e-commerce and in particular to communicating commercial information via electronic documents.

2. Background of the Invention

The present application is an improvement upon U.S. patent application Ser. No. 09/466,627 referenced above.

In the field of e-commerce, there are many different players. Some of the players are large, and have used existing industrial electronic document specification languages for up to thirty years. These existing languages include Electronic Data Interchange ("EDI") and Electronic Data Interchange for Administration, Commerce, and Transport ("EDIFACT"), both maintained by the Data Interchange Standard Association ("DISA", http://www.disa.org), and the Intermediate Document ("IDOC", http://www.sap.com). Some of the players are small and therefore could not participate in electronic commerce when only these older languages were available.

Now even the smallest entities can aspire to participate in electronic commerce. However, these smallest entities commonly use popular formats such as Extensible Markup Language ("XML"), while the larger entities continue to use the prior industrial electronic document specification languages. The existing industrial electronic document specification languages are sufficiently complex that small entities do not have the resources to master them. Accordingly, when small entities wish to interface with large entities there are several possibilities:

call a human customer service representative at the larger entity;
use a web browser to access the web site of the larger entity and enter data manually; or
hire a contractor skilled in the industrial electronic document specification language to assist in format conversion.

This latter is generally the only option for suppliers to large industrial concerns, when the larger concerns have the market power to demand particular electronic formats from their vendors. The necessity of hiring a middleman makes it expensive to deal with larger concerns and in fact ultimately increases the cost of manufactured products.

New XML formats that preserve the structures of existing industrial electronic document specification languages (such as EDI) can be very useful for small entities. Such XML formats include XEDI as discussed in J. Ricker et al., "XML and EDI: Peaceful Co-Existence" XML Solutions, White Paper, XEDI (http://www.xedi.org).

The prior application Ser. No. 09/466,627 allowed for automatic retrieval of data from a relational database into an XML document using an annotated Document Type Definition ("DTD"), an annotated DTD being referred to as "DTDSA". However, there was no guarantee that the resulting XML document would be usable by other entities, who might not have the same data dictionary or schemas as the holder of the relational database, or who might be working in industrial electronic document definition languages other than XML.

Moreover, a number of problems were uncovered in attempting to automatically deposit data from an XML document back into the relational database.

SUMMARY OF THE INVENTION

It would be desirable to use a data processing device to automatically present data retrieved from a relational database in a format that would be suitable for users of standard industrial electronic document specification languages.

Advantageously, data retrieved from a relational database into a local format may again be retrieved, by a second retrieval operation, using at least one second annotated schema to convert from the local format into the standard industrial format.

It would also be desirable to deposit received electronic data back into the relational database.

Advantageously, deposit will involve use of at least one annotated schema to convert data from an electronic document specification language into commands suitable for storing data. Moreover, a two pass deposit process may first convert from a standard industrial document specification language into a local format and then from the local format into the commands.

In addition, when deposit is sought it must be determined whether the local system is configured to accept deposit to all requested fields. To further advantage, the deposit process or system must propagate changed fields throughout all affected tables, not just the one(s) specified for retrieval.

Other objects and advantages shall be apparent from the following.

BRIEF DESCRIPTION OF THE DRAWING

The invention will now be described by way of non-limiting example with reference to the following figures:

FIG. 2C is a partial DTD for the XEDI syntax;

FIG. 4C shows the DTDSA after the third preparation stage;

FIG. 5A is a sample EDI map (EDI 850) in a database;

FIG. 5B is a sample EDI validation table in a database;

FIG. 6 shows how FIGS. 6A and 6B fit together. In the rest of the specification, any reference to the contents of FIG. 6 will actually be referring to the contents of FIGS. 6A and 6B.

FIGS. 6A and 6B show the annotated EDI template for PO after the first preparation stage.

FIG. 8B shows an intermediate data stream in name/value pair format;

FIG. 8C shows output XML in XEDI format relating to PO.

FIG. 9A shows output XML in XEDI format relating to a header.

FIG. 9B shows output XML in XEDI format relating to N1 loops.

FIG. 9C shows how FIGS. 9C-1 and 9C-2 fit together. In the rest of the specification, any reference to the contents of FIG. 9C will actually be referring to the contents of FIGS. 9C-1 and 9C-2.

FIGS. 9C-1 and 9C-2 show output XML in XEDI format relating to PO1 loops.

FIG. 10A illustrates a sample DTDSA for BUYERS;

FIG. 10B illustrates a sample XML document that conforms to the underlying BUYERS DTD in FIG. 10A;

DETAILED DESCRIPTION OF THE PREFERRED EMBODIMENTS

Herein, the following definitions will be used. A data source or document "schema" describes the structures and types for data or documents. An "annotation" furnishes the schema with mapping functions that connect data from heterogeneous data sources and target data segments.

In the following, the preferred embodiments of the invention for managing interoperable structure documents from heterogeneous data sources using correlated schema annotations will be described, inter alia.

In this invention, the preferred target data source is an XML data source, and the preferred target schema is the DTD. The uniform target schema (or DTD) is preferably in XEDI format, where XML ensures structure interoperability, and EDI ensures data interoperability.

Figure 1:
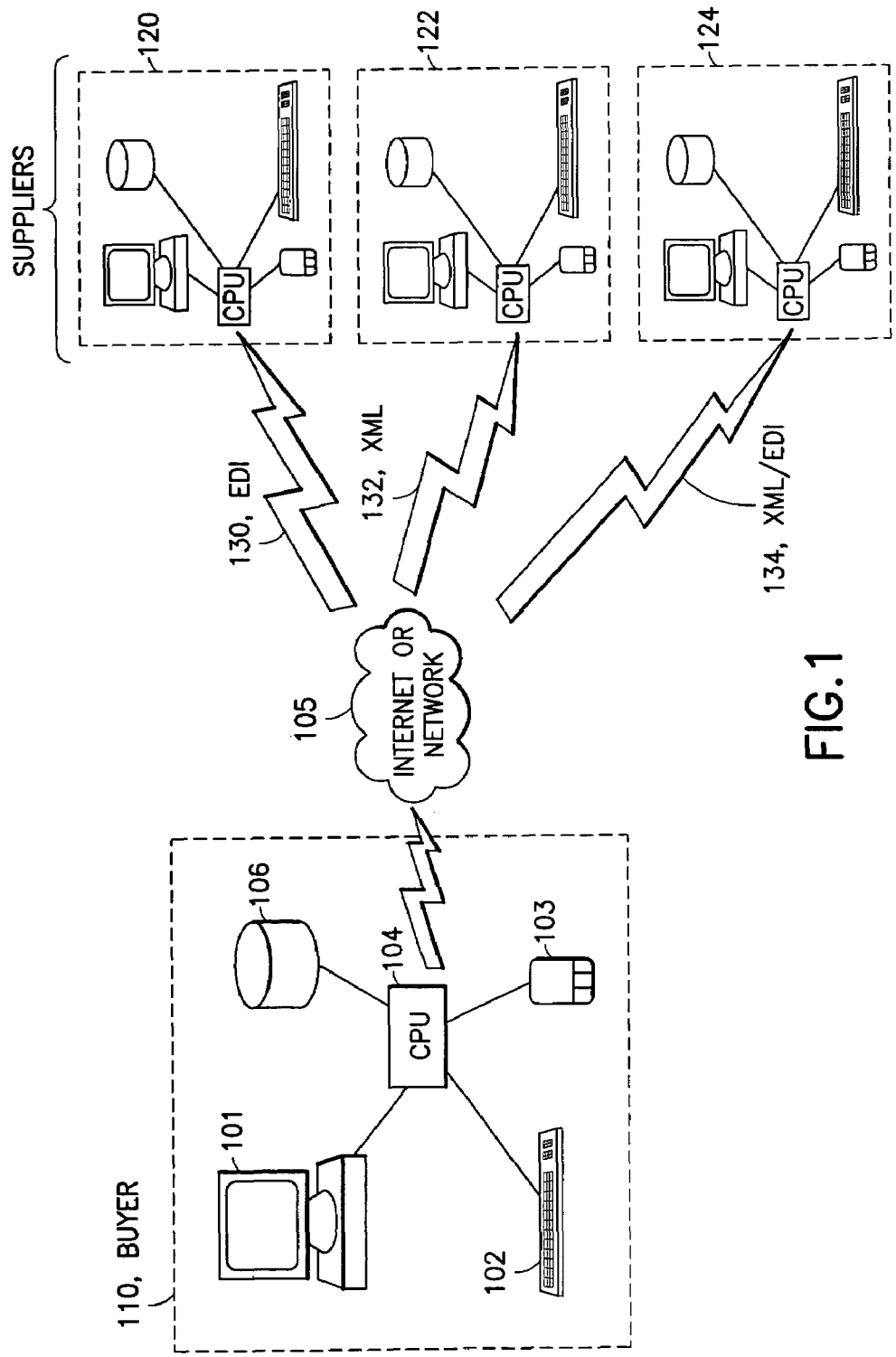
FIG. 1 shows a digital data processing system on which the invention can be implemented.

FIG. 1 shows a digital data processing system on which the invention can be implemented. The system will typically include a CPU 104, a memory device 106, a display device 101, data entry devices such as keyboard 102 and mouse 103, and a network connection 105. The CPU might be any kind of processor such as a PC, any other general purpose processor, parallel processing device, or distributed processing system The memory device might be of any sort, such as a hard drive, a floppy drive, a zip drive, a CD-ROM drive, or several such devices. Other devices for communication with a user might also be attached.

The network connection will commonly be an Internet connection, but it might also be an Intranet or other local network connection, such as a LAN. Both a local and an external network connection might be present.

The memory device 106 will commonly house data and software. The data will include data that a user may seek to communicate with the outside world or data to be used internally. The software might be of various sorts, including software for implementing the invention. However, the invention might also be implemented in hardware.

While the system shown has a local memory device 106, memory accessible via the network connection 105 might be used instead of a local memory device. Similarly, the CPU 104 might be remote from the display 101 and data entry devices 102 and 103.

A user might seek to communicate data to the external world under many different circumstances. For instance, suppose a user tracks an inventory of suppliers in a relational database within memory device 106. The database program will signal to the user when some inventory item, such as pencils, becomes low. The user may then wish to order the low inventory item via the Internet. The order will typically be expected to be conveyed to the supplier in a standard format, such as an EDI purchase order form 130 or an XML purchase order form 132. Traditionally, generating and receiving EDI orders can only be implemented by large corporations 120, and may not be suitable for mid-sized and small buyers and suppliers. It is more affordable using the XML format. The user might fill out the XML purchase order form manually, but this could become burdensome if frequent orders are to be undertaken. It would be desirable for the CPU 104 to convert the low inventory information from the relational database directly onto the XML purchase order form. When the inventory items arrive, it would also be desirable for the CPU 104 to convert an XML invoice form into relational database information to be stored into the memory device 106.

However, even using the XML format, the CPU at the buyer site 110 may not generate XML purchase orders that are meaningful and understandable to the CPU at the supplier site 122, due to different vocabularies and document structures between both parties. The CPU at the buyer site may not understand the incoming XML invoice forms and thus can not automatically store them into the memory device. It is highly desirable to choose a standard XML format that is understandable by all parties. The XML/EDI 134 is an interoperable format that is in XML form and yet maintains the EDI structure understandable by both the buyer 110 and the supplier 124, where both parties can download the well-defined EDI structures maintained by standard organizations, such as DISA.

There are hundreds of different types of standard EDI documents, e.g., purchase order (PO), invoice, purchase order change (POC), request for quotes (RFQ), and request for proposals (RFP) etc. It requires hundreds of programs to generate business documents from the relational databases into XML/EDI format, and it requires an equal number of programs to store the received XML/EDI documents into relevant databases. Such an ad hoc programming approach may be tedious to implement, hard to maintain, and expensive to deploy. An annotation-based approach in accordance with the invention eliminates the hundreds of ad hoc programs for generating and storing the different types of XML/EDI documents from and into multiple data sources.

The data to be converted need not be from a relational database. It might equally well be object-oriented, semi-structured, or be organized according to other schemas. Using this framework, one DTD can correspond to multiple heterogeneous data sources, and a single data source may be associated with many different DTD's.

Those of ordinary skill in the art might recognize any number of other situations where conversion of data into XML or depositing XML documents into multiple data sources would be desirable.

Interoperable XML Document Processing

Different types of business documents, such as PO, invoice, and RFQ, may share the same schema or structure. For documents that already conform to a standard format such as EDI, among the same type of documents, an additional structure interoperable format for all types of documents, such as XEDI, would provide an extra level of interoperability, which is conducive to business document exchange.

Figure 2A:
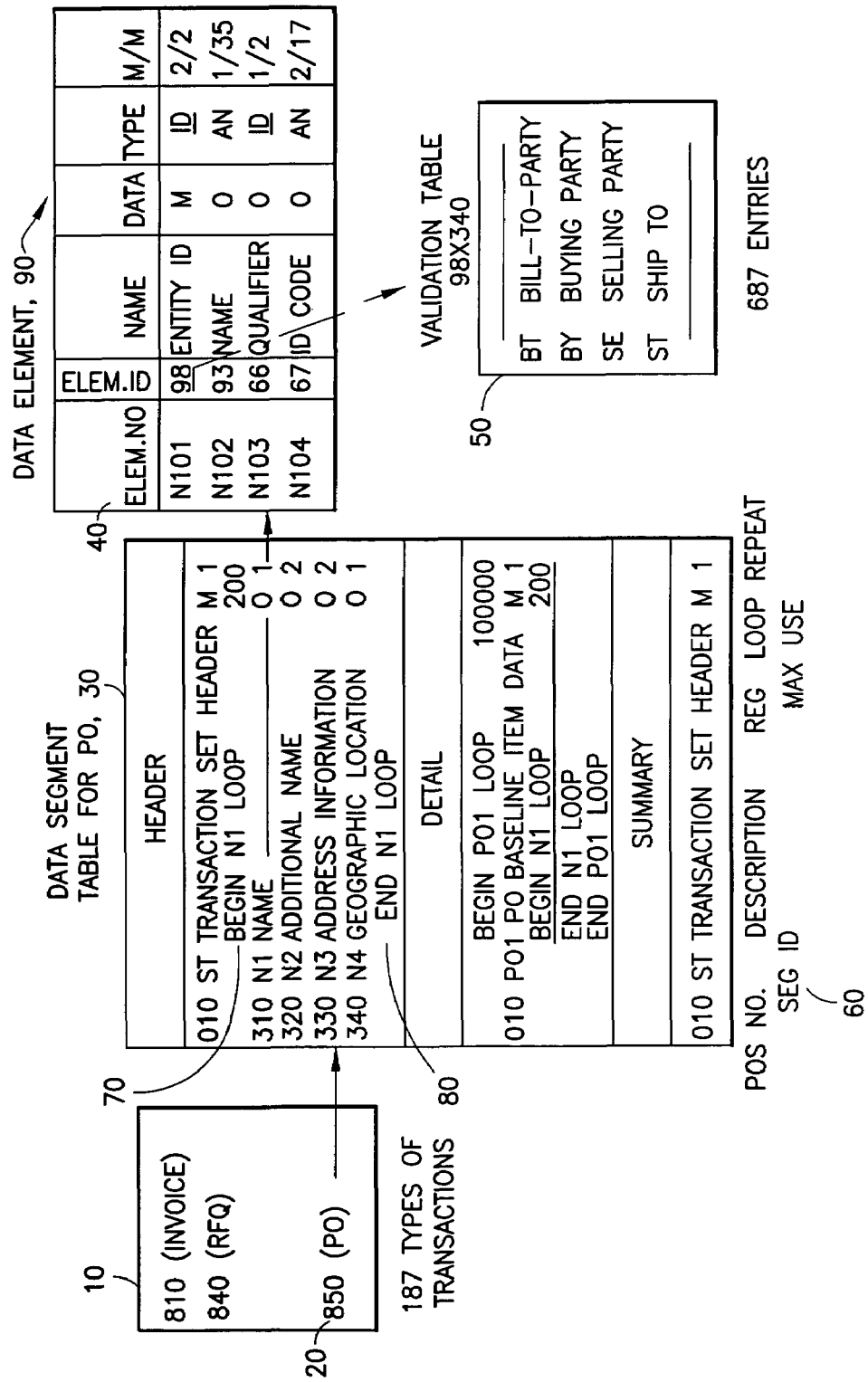
FIG. 2A is a partial ANSI X12 EDI superset map (version 003 release 040)

FIG. 2A depicts a partial ANSI X12 EDI superset map (version 003 release 040), which illustrates the basic EDI document structure (transaction set, loop, segment, element, name). There are more than 187 transaction sets or document types all representable as block 10. For example, the transaction set at 20 with a number 850 is a purchase order document type. Every transaction set in accordance with EDI includes a map table at block 30, defining all the possible data segments that can be included in the transaction, and their orders. There are three sections in the map: header, detail, and summary. The column defining segment ID 60 lists all the possible data segments. Map table 30 includes position tags that can define nested loops. For example, the position tags BEGIN_N1_LOOP 70 and END_N1_LOOP 80 form a loop that includes four segments N1, N2, N3, and N4. However, the position tags will not be in EDI messages. Also in accordance with EDI, every data segment can have a corresponding data element table, which further defines smaller entities for the data segment. For example, data element table 40 relates to the N1 segment, and defines four elements N101, N102, N103, and N104. There is a data type 90 for each data element. For the data type ID, it means that the content of the current data element is a shorthand notation, and should be decoded using a corresponding validation table. For example, the block at 50 is for data element N101 with element number 98, and includes full descriptions on trading partners or roles. There are more than 600 entries in this table.

Figure 2B:
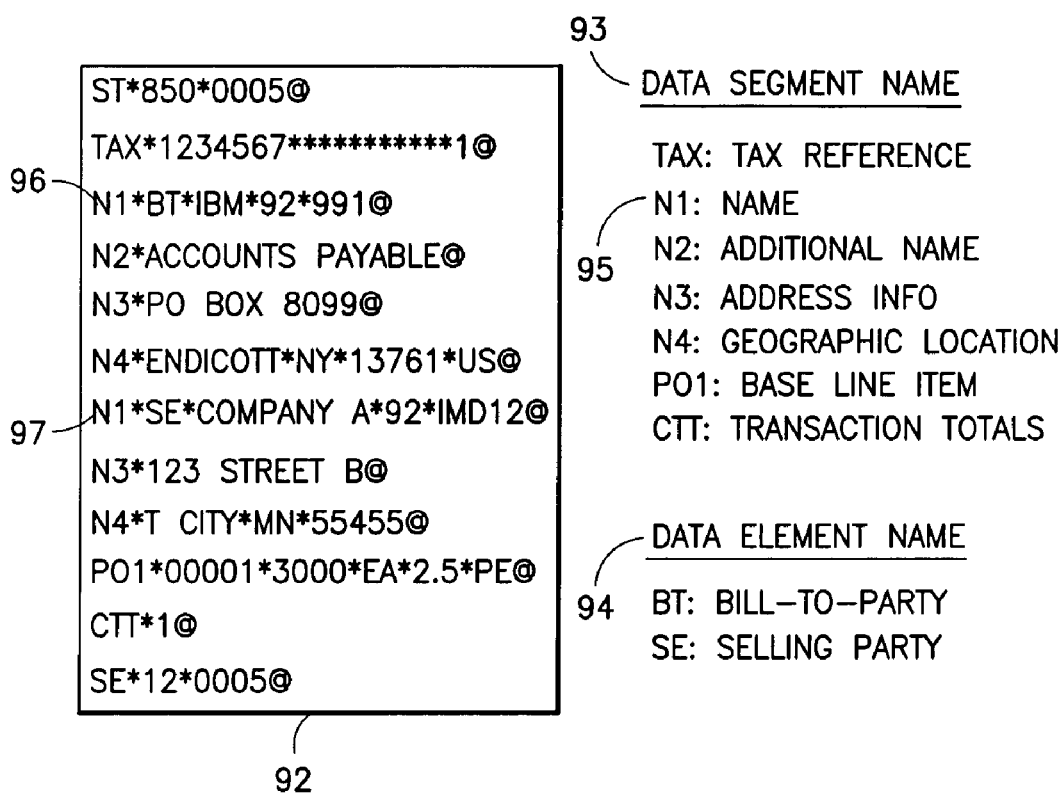
FIG. 2B is a sample PO message in EDI format.

FIG. 2B illustrates a sample PO message in EDI format at block 92. The data segment name table at 93 and data element name table at 94 can help understand the meaning of the EDI message. For example, the data segment name at 95 denotes a general name. There are two loops related to N1, as indicated by the N1 segments at 96 and 97. The real message is a flat file as shown in 92, which has no position tags to indicate the presence of these loops.

FIG. 2C shows the universal target DTD for the XEDI documents. All of the different types of XML business documents share the same interoperable DTD that is based on the structure of the EDI map, not on the values. The elements that belong to the envelop of the documents are not shown for simplicity. In this example, six elements are shown, transactionSet at 200, loop at 210, segment at 220, element at 230, name at 240, and value at 250, which nicely capture the basic structure of the EDI, as 5 out of the 6 elements relate to the EDI structure, and the remaining one, value, relates to the real data.

Separate or ad hoc programming efforts are required to compose or store different types of business documents from or into heterogeneous data sources. Based on the same interoperable target DTD (as shown in FIG. 2C), EDI content structure map (as shown in FIGS. 2A and 2B), and real business data from either database tables or from objects, the users need to customize the programs once for each XML document type.

The invention does not require programming. Most of the engines and data formats are transparent to the users. To generate XML documents of different types, the users only need to annotate one template for each different type of XML documents. The annotation process is based on the stored EDI maps that include detailed descriptions of the related data elements. A graphical user interface ("GUI") tool may be provided for annotation. Based on the annotations, the second engine can retrieve real data from relational tables or object stores, create suitable labels from the annotated EDI map, and associate data contents with the labels.

Figure 3:
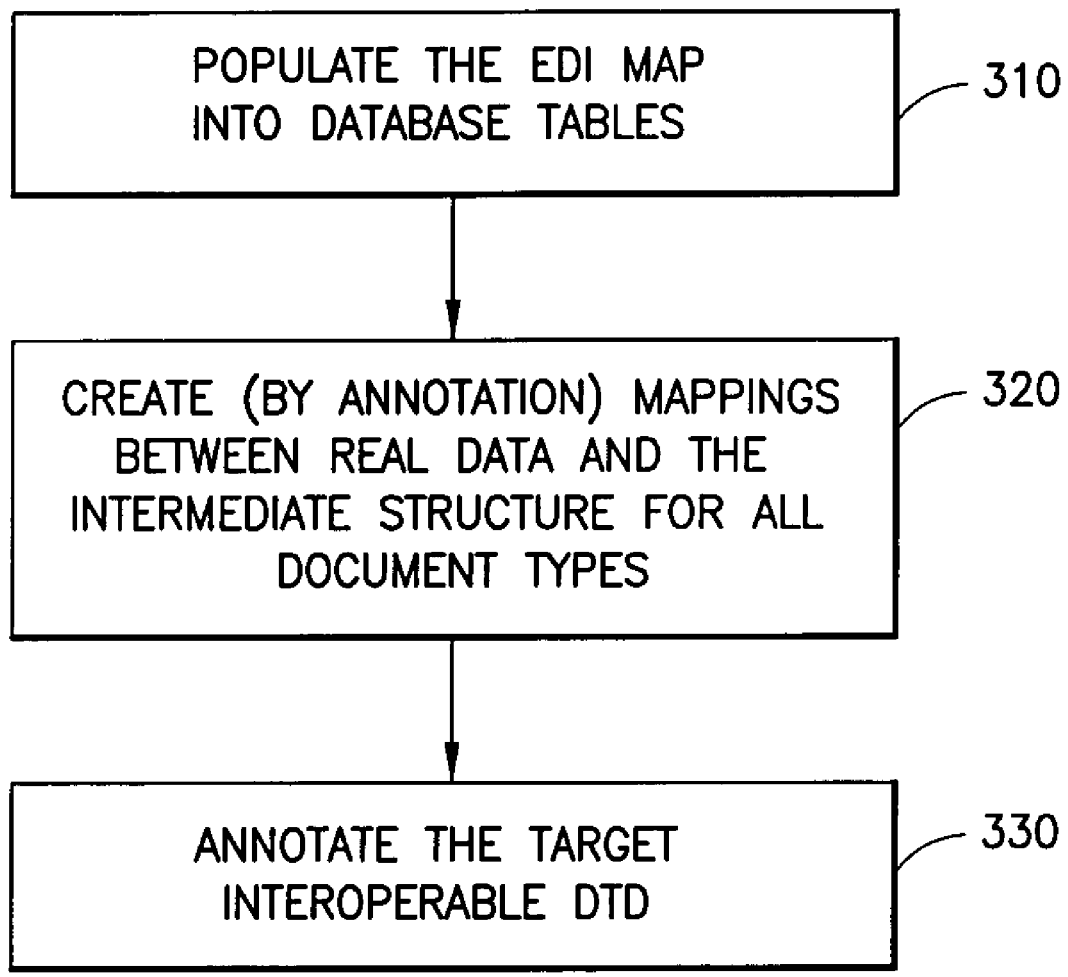
FIG. 3 shows the three preparation stages for retrieval according to the preferred embodiment.

FIG. 3 shows the three preparation stages for retrieval from a database in accordance with the preferred embodiment. The first stage 310 populates the EDI structure map or information into relational database tables. The second stage 320 creates annotations that can map the real data (from multiple data sources) to an intermediate data stream (can be a list of name/value pairs or an intermediate XML document), one mapping for each business document type. The third stage 330 annotates the target interoperable DTD that is fixed for all of the different business document types.

Figure 4A:
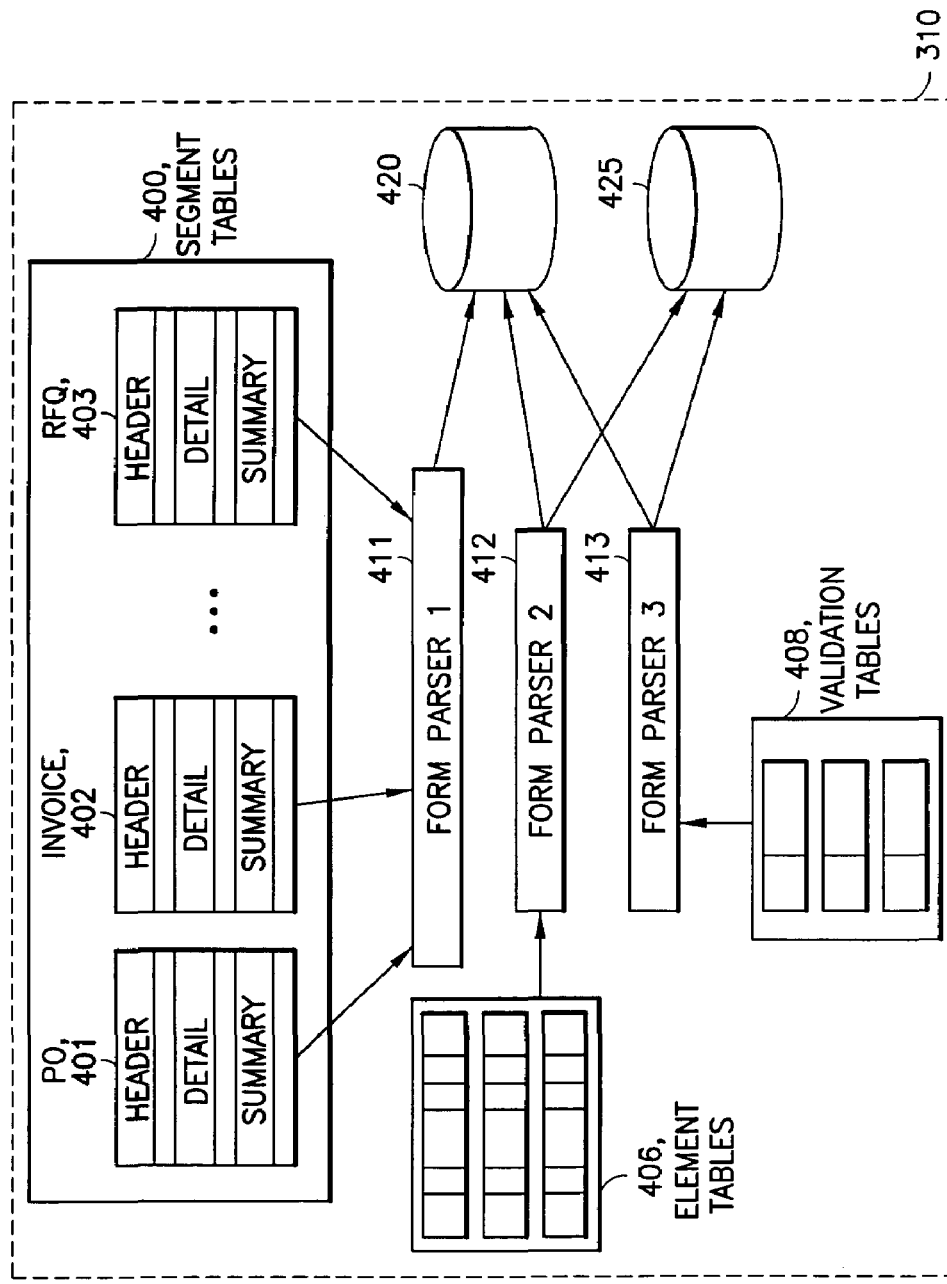
FIG. 4A shows the procedure for the first preparation stage.
Figure 4B:
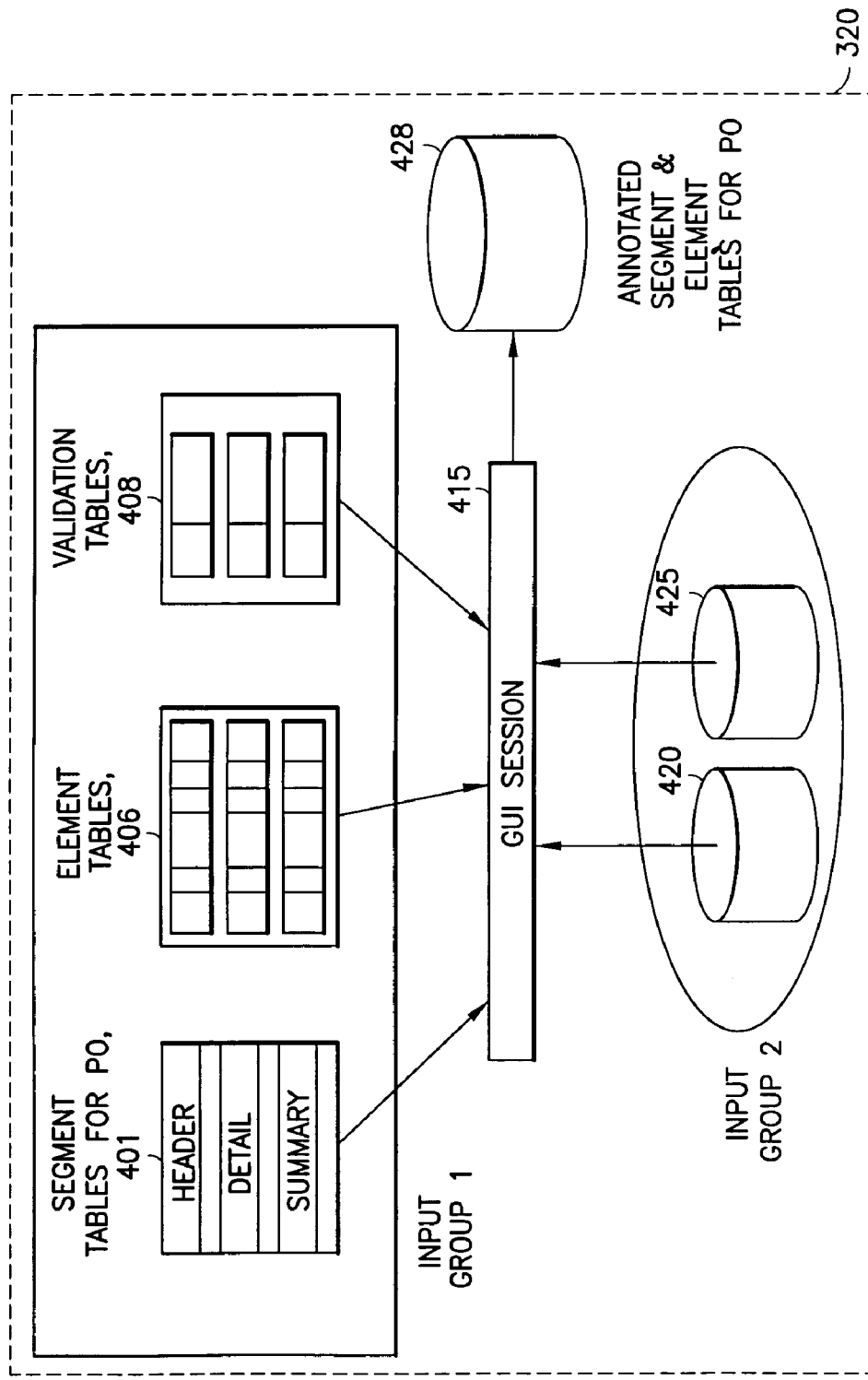
FIG. 4B shows the GUI session for the second preparation stage.

FIG. 4A shows the first-stage procedure 310 in detail, and FIG. 4B shows the second-stage GUI session 320. The first stage procedure populates all of the EDI structures into two database tables, where one table 420 collects EDI segment tables 400 for all types of document, such as PO 401, invoice 402, and RFQ 403, as shown in FIG. 5A, and the other table 425 records dictionaries for the element tables 406 and validation tables 408, as shown in FIG. 5B. There are three form parsers 411, 412, and 413, that can scan segment tables 400, element tables 406, and validation tables 408, respectively, and store the structural information into the two tables 420 and 425. Due to the highly regular syntax of the EDI maps, both tables can be prepared manually or automatically. For example, if the segment tables, element tables, and validation tables are in HTML format, the form parsers can observe the patterns between segments and elements, and thus store relevant information into the two tables.

FIG. 5A shows a sample EDI map table that is stored in a database table 420. The layers are embedded using the MAP and CODE columns at 500 and 502. The POS column at 504 is used to maintain the original map order. The CHOICE column at 506 determines the type of the current item specified by the CODE column. This information is useful, especially for loops and segments. The values of the CHOICE column are used to annotate and resolve the construction rule (loop|segment) of the transactionSet 200 and the loop 210 definitions as shown in FIG. 2C. The TYPE column at 508 indicates if the value element includes a raw data or additional validation table lookup is needed. The NAME column at 510 is for the name element 240.

FIG. 5B lists a sample EDI validation table that is also stored in a database table 425. The ELEMENT ID column at 520 matches those rows or records in the EDI map table, which have the same value in the CODE column at 502, whose CHOICE column at 506 has a value "element", and whose TYPE column at 508 has a value "ID". The CODE column at 522 in the validation table shows the shorthand terms that can appear as data contents. The VALUE column at 524 shows the long descriptions. For example, in FIG. 5A, the first element of the N1 segment (515) has a code value "98" (516), choice value "element" (517), and type value "ID" (518). It matches the four entries at 530, 531, 532, and 533 that have the same ELEMENT ID "98" in FIG. 5B. The four possible CODE values are "BT" (540), "BY" (541), "SE" (542), and "ST" (543), representing different roles or parties, "Bill-To-Party" (550), "Buying Party" (551), "Selling Party" (552), and "Ship To" (553).

The second stage 320 creates annotated templates for all types of documents, using a GUI tool The annotated templates map real data to intermediate documents, whose formats may include a list of name/value pairs, and XML. The sources can be the original EDI tables 401, 406, and 408, or the two database tables 420 and 425 that were collected during the first stage. For example, as shown in FIG. 4B, the GUI tool can prepare a PO document template by pulling relevant information recursively (using the standard depth-first traversal algorithm) from the sources, displaying such template on the screen, accepting user annotations, and storing the annotated PO template to a database table 428, as shown in FIG. 6.

Figures 6, 6B:
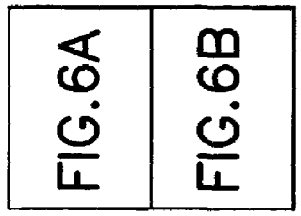

FIG. 6 is the annotated EDI template for PO, which is stored in a database table 428. The template is a summary of the EDI map tables, since it only includes information relevant to PO. The template is also expanded from tables 420 and 425. The level column at 610 records the layered relation among EDI segments and elements, which can be collected during the depth-first traversal The segment and element code column at 600 matches the CODE column 502 in FIG. 5A, except that for integer values we use the concatenation of its element name, '/', and the integer. For example, "ST01/143", and "N101/98". It is good for visualization during the GUI session. The repeat column at 602 indicates that the current loop or segment can occur multiple times if there is a '*' symbol, such as the LOOP_PO1 at 625 and LOOP_PID at 627. The description column at 606 describes the meaning of each segment or element. The label column at 608 records the current path during the depth-first traversal. Actually this column can be constructed during the GUI session, but we include it for better visualization and for the ease of subsequent discussions. The annotation column at 604 is provided by the users. It can include fixed constants, e.g., "850" at 646, "1" at 642, and '1' at 644, value specifications, e.g., in0 at 628 and y.addr at 629, and binding specifications, e.g., y:=row(company, coid, x.buyer) at 630. The definitions and usages of the value and binding specifications are included in the prior application Ser. No. 09/466,627. The annotation y:=row(company, coid, x.buyer) means to select from company table where its cold column equals x.buyer, and to bind the returned records or rows to the variable y. The annotation y.addr means to return the scalar value of the addr column in the current row bound by y.

The GUI tool can allow users to specify either a fixed or a dynamic number of occurrences that a loop can have. If the number of iterations is fixed, the GUI tool needs to duplicate the loop to match the number. For example, the users may specify two occurrences of LOOP_N1, one for the buyer, and the other for the seller, as shown in FIG. 6. The first LOOP_N1 at 620 relates to buyer ("BY" at 621, and x.buyer at 630), and the second LOOP_N1 at 622 relates to seller ("SE" at 623, and x.seller at 635). The number of line items is dynamic and is dependent on the number of records in the lineitem table where poid=in0, as indicated at 625 and 640.

FIG. 4C is the annotated interoperable DTD after the third stage 330. It should be fixed for all of the different XML document types. There are two input variables, in0 and in1. To generate a PO, we can supply the input value 'TS850' to the input variable in1 in the first SQL function at 456. To generate an invoice, the term 'TS810' may be used as an input value. The getDocumentNumber(in1) function at 459 truncates the leading "TS" to obtain the real document type, e.g., 850 and 810. The getDocumentType(in1) function at 460 translates the document number indicated by in0 into meaningful types, e.g., Purchase Order and Invoice. The input variable in0 is a unique document number. The first five elements, transactionSet at 450, loop at 451, segment at 452, element at 453, and name at 454 all relate to the EDI structure, whose values can be obtained from the EDI map table in the database table 420, as shown in FIG. 5A. The annotation also ensures that the path information can be recorded down to the element level by the variable p, using the concatenation function like ::p:=<concat(p, "@", x.code)> at 457. For example, the label for the N1 segment can be "LOOP_N1@N1". Such path information is useful in matching with the labeled intermediate data stream during both the retrieval and deposit processes. The function getE-DIValue(id, 1) at 470 gets the next available value from the list of name/value pairs whose label matches 1||"@"|| id. The function id4Element(val, type) at 472 returns the first parameter val if type="ID", and returns a null string otherwise. The function value4Element(valShort, id, type) at 474 returns the expanded version of valShort using the validation table at 425, and valShort and id as keys, if type="ID", and returns the short version valShort otherwise.

Figure 7A:
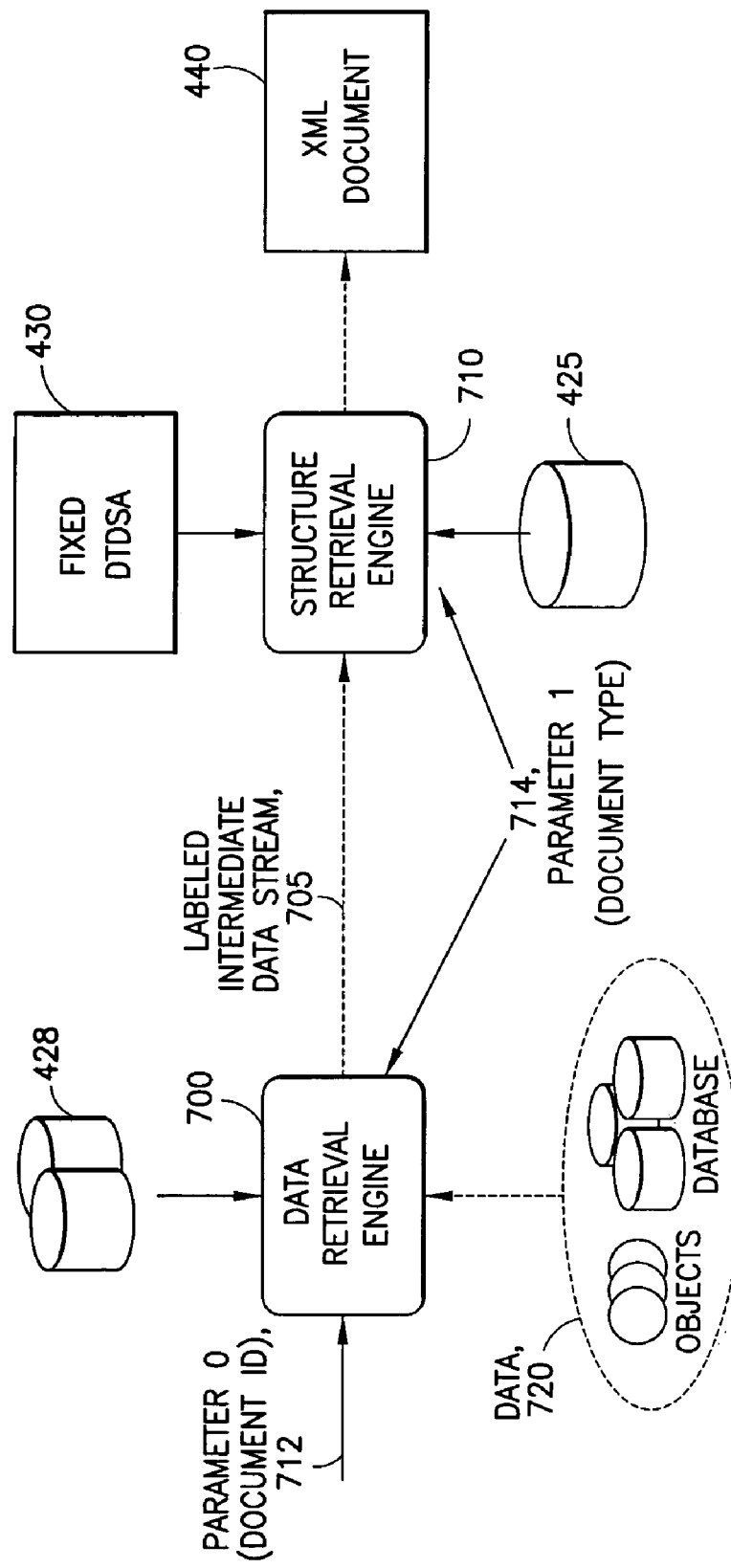
FIG. 7A shows the data and document flow for the retrieval process.
Figure 7B:
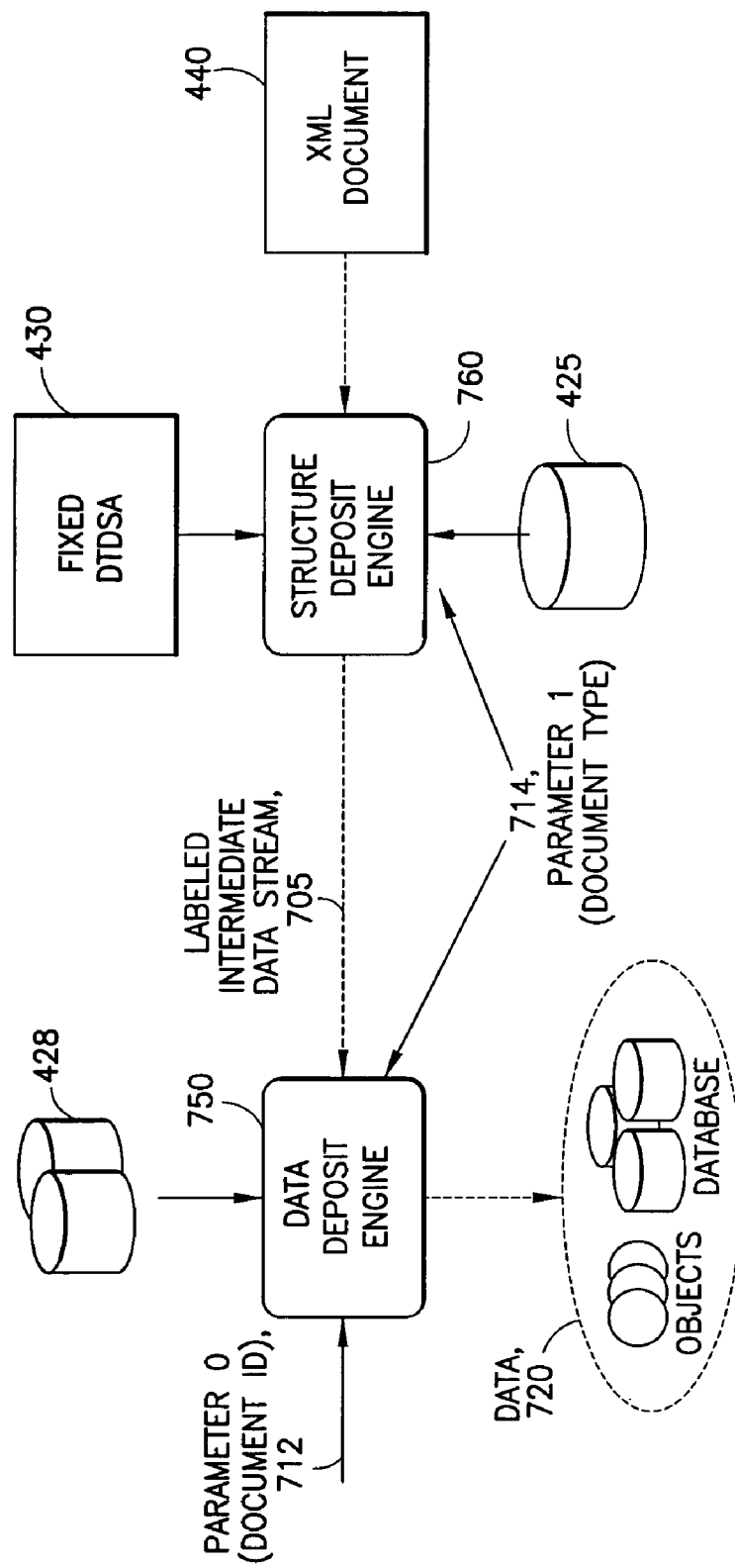
FIG. 7B shows the data and document flow for the deposit process.

FIG. 7A shows the data and document flow for the retrieval process. The dotted arrows indicate the direction of the data flow between two retrieval engines, the data retrieval engine 700 and the structure retrieval engine 710. The data retrieval engine accepts the first parameter (parameter 1) to decide which type of document to generate, and which template from database tables 428 to use. It also accepts the second parameter (parameter 0), to retrieve real data and to compose exactly one intermediate XML document or a list of name/value pairs at 705, from the multiple database tables or object stores 720. The structure retrieval engine composes the output XML document 440 based on the fixed DTDSA template for the structure, and the labeled intermediate data stream 705 for the data contents. It may need to check with the validation table stored as a database table 425 for data expansion, since the shorthand terms may be in the intermediate data stream. Both data and structure retrieval engines employ the same retrieval algorithm (based on annotation) as in the prior application Ser. No. 09/466,627.

Consider now in FIG. 4C, the path information collected by the structure retrieval engine is useful in matching with the labeled intermediate data stream from the data retrieval engine. The data retrieval engine is invoked by the function initValue(in0) at 458. The last of the 6 elements is the value element at 455, whose annotations need to guide the structure retrieval engine to get the real EDI values from the labeled data stream to convert to fill descriptions if the types are ID's (using the validation table in FIG. 5B), and to associate the original shorthand value to the attributes. The matching process assumes a standard queue, so that multiple occurrences of the data with the same label will be matched in a first-in-first-out order.

Figure 8A:
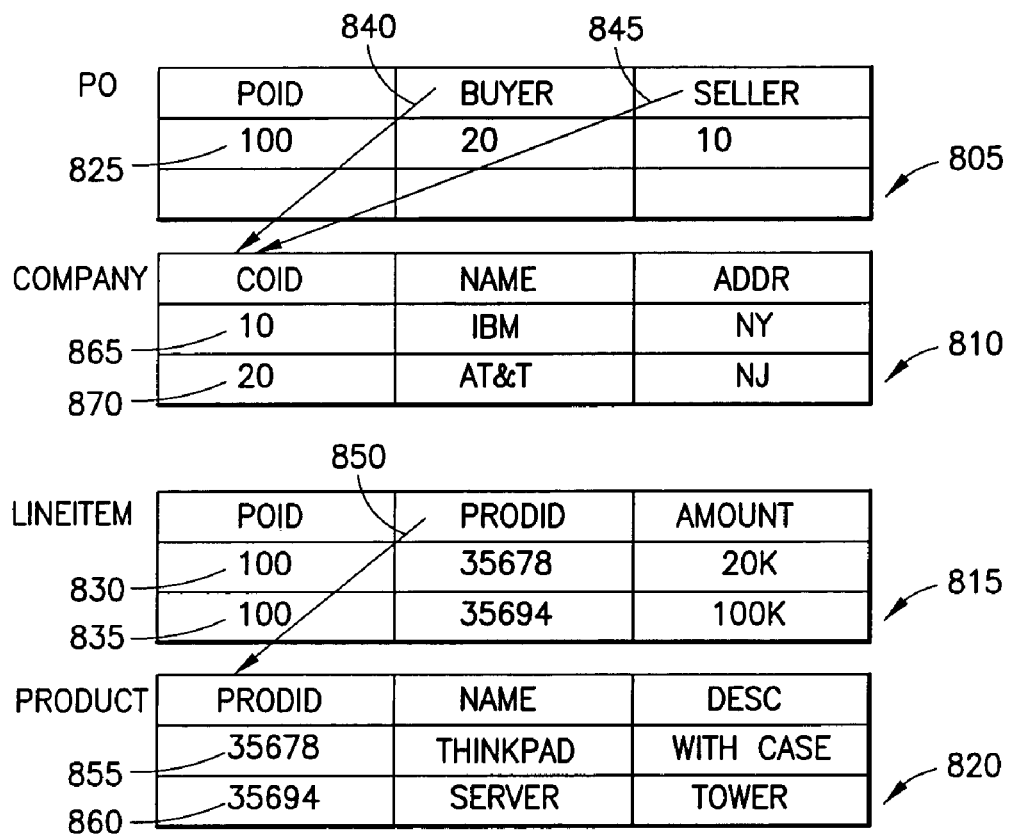
FIG. 8A is a diagram illustrating an example of a relational schema.

FIG. 8A illustratively includes four relational tables, also known as a relational schema, purchase order ("PO") 805, company 810, lineitem 815, and product 820.

Table 805 has three columns, purchase order identification ("POID"), buyer, and seller. The rows of the table have numerical index values pointing to values for the columns. Thus purchase order number 100 is associated with buyer 20 and seller 10.

Table 810 has three columns: company identification ("COID"), name, and address ("ADDR"). The rows associate numerical values with actual company names and addresses. Thus the numerical value 10 is associated with the company IBM, having an address in New York, and the numerical value 20 is associated with the company AT&T, having an address in New Jersey.

Table 815 has three columns: POID, product identification ("PRODID"), and amount. The rows, 830 and 835, associate purchase order identification numbers with product identification numbers and quantities. In the figure, purchase order 100 is associated with two product identifications, 35678 and 35694, of which 20 k and 100 k are ordered respectively.

Table 820 has three columns, PRODID, name, and desc. (description). The rows associate product identification 35678 with a "THINKPAD™" and product identification 35694 with a server.

Arrows in FIG. 8A illustrate foreign key relations among various fields. For example, the record 825 in PO table with POID=100 is related via arrows 840 and 845 to two records 865, 870 in the company table 810. Similarly, records 830 and 835 are associated via arrow 850 to records 855 and 860.

Based on the two parameter values in0="TS850" and in1="100" at 899, the template for PO shown in FIG. 6, and the tables in FIG. 8A, the data retrieval engine can generate the intermediate list of name/value pairs as shown in FIG. 8B. The list includes 18 pairs of names (or labels) and values, e.g., the label ST@143, and the value "850" at 880. The two occurrences of LOOP_N1s at 620 and 622 yield two groups of pairs at 886 and 887. The shorthand terms "BY" at 890 and "SE" at 892 are from the fixed values at 621 and 623, respectively. The two groups of LOOP_PO1s at 888 and 889 are due to the annotation z:=row(lineitempoid, "100") at 640, which returns two records (830 and 835), with PRODID 35768 (at 895) and 35694 (at 896), respectively.

FIGS. 8A, 9A, 9B, and 9C are the output XML in XEDI format, after feeding the labeled intermediate data stream as shown in FIG. 8B and an input value in1="TS850" to the structure retrieval engine. There are five components generated, one header at 800 shown in detail in FIG. 9A, two N1 loops at 802 and 804 shown in detail in FIG. 9B, and two PO loops at 806 and 808 shown in detail in FIG. 9C. in the ST segment, the name "Transaction Set Header", the element code "143", and the name "ID Code" are from the description column at 650, entries 651, and 652, respectively, while the value of the second element "100" is from the input parameter.

FIG. 9B shown the two N1 loops (802 and 804), where the first loop has a role "BY" at 910 that was expanded to "Buying Party" at 912, and the second loop has a role "SE" at 920 that was expanded to "Selling Party" at 922. The expansions are due to the validation checking (FIG. 5B) by the value4Element(valShort, id, type) function at 474, where valShort is "BY" (or "SE"), id is "98", and type is "ID". FIG. 9C shows the two PO1 loops (806 and 808), where they correspond to line items 35768 (at 935) and 35694 (at 945), respectively. Both loops also include nested PID loops at 930 and 940.

FIG. 7A shows the data and document flow for the deposit process. Given an XML document in XEDI format (440), the structure deposit engine at 760 will parse the document and generate a labeled intermediate data stream 705, which may be an intermediate XML document, or a list of name/value pairs. Since the XEDI format maintains the EDI structure, there is no need to access the validation table 425, and the input parameter in0. They are in the figure mainly for verification purposes. Generating a label for each data content is straightforward, as the structure deposit engine can traverse the XML in depth-first search order, and attach/remove the current tag name along the way. Once the intermediate data stream has been produced, the data deposit engine at 750 can absorb it based on the annotations in the template 428. We will examine the deposit process in more detail in the following session.

Consider the sample PO XML in XEDI format shown in FIGS. 8C, 9A, 9B, and 9C, the structure deposit engine can produce a list of name/value pairs as shown in FIG. 8B. Applying the deposit algorithm, the data deposit engine can store data contents into related database tables or object stores.

The Deposit Process

In the prior application Ser. No. 09/466,627, retrieving data to an XML document based on DTDSA is a straightforward top-down function evaluation process that works initially from the DTDSA root, recursively traverses the DTDSA graph in depth first order, evaluates the binding annotations along the paths, and resolves value annotations. The needed values for resolving the annotations are mostly coming from tables, constant values, or user inputs. For relational tables, the SQL statements created and executed include only the select statements.

On the other hand, depositing data from an XML document into multiple tables and data sets automatically based on the annotated DTD (DTDSA) involves a reverse operation of the document retrieval process. The values needed to resolve annotations come from XML contents and attributes, which are associated with all of the leaf elements in the DTDSA. XML contents are collected and bundled in an orderly fashion. Relevant SQL insert, delete, update statements, or a combination of them are automatically created and executed, as appropriate.

FIG. 10A illustrates a sample DTDSA for BUYERS. The element definition at 1020 defines BUYERS with one child element buyer that can occur zero or more times denoted by the '*' symbol at 1000. The number of occurrences for the buyer element depends on the binding annotation at 1005, r:=row(buyers), where it binds the list of rows from the table buyers 1030 to the variable r. Therefore, r relates to the table buyers. The element definition at 1021 defines buyer with five child elements ID, name, address, itemname, and buyDate, all of which in turn define at 1022, 1023, 1024, 1025, and 1026, respectively, the leaf elements, as denoted by the "#PCDATA" construct 1040. Let the function field(tab, col, var) denote the value of the column col from the row bound by var where the row relates to table tab. We use the shorthand representation var.col if the table name is obvious. The binding annotation at 1010, x:=row(company, <coid>, <field(buyers, buyerid, r)>), binds x to the rows from company table 1035 under the join condition coid=field (buyers,buyerid,r). Therefore, x relates to the table company. Among the six field functions at 1006, 1007, 1008, 1009, 1011, and 1012, four (1006, 1007, 1008, and 1009) relate to r and the table buyers, with corresponding columns buyerid, buyerid, itemname, and buyday, while two (1011 and 1012) relate to x and the table company with corresponding columns name and addr.

FIG. 10B illustrates a sample XML document that conforms to the underlying BUYERS DTD in FIG. 10A. There are two buyer elements 1050 and 1060, each of which includes five child elements ID, name, address, itemname, and buyDate. The five child elements include real contents such as the buyer number 1 (at 1055) on Jul. 4, 2000 (at 1059) purchased a copy machine (at 1058) from IBM (at 1056) based in New York (at 1057). Data from the sample XML needs to be deposited into buyers and company tables based on the DTDSA in FIG. 10A.

Figure 11A:
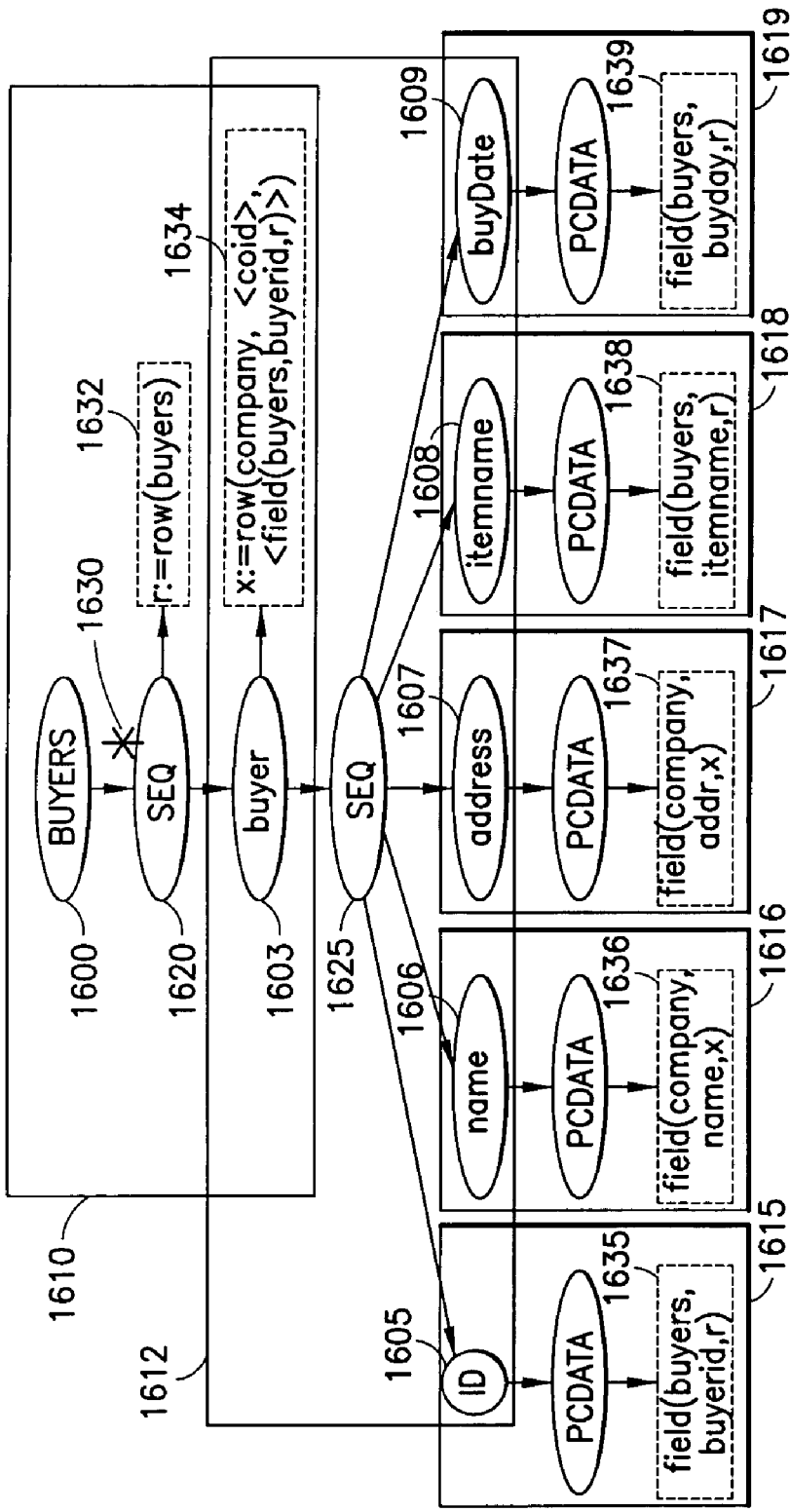
FIG. 11A depicts the internal representation or graph for the DTDSA shown in FIG. 10A.

FIG. 11A depicts the internal representation or graph for the DTDSA shown in FIG. 10A, where the seven element definitions are enclosed by dotted boxes at 1610 for BUYERS, 1612 for buyer, 1615 for ID, 1616 for name, 1617 for address, 1618 for itemname, and 1619 for buyDate respectively. There is an oval node for each element defined, such as oval nodes at 1600, 1603, 1605, 1606, 1607, 1608, and 1609. The SEQ nodes (1620 and 1625) group sequences of nodes and CHOICE nodes group alternatives in the DTD specification. The '*' symbol associated with a node, such as 1630, represents that the node can repeat zero or more times. The annotations are enclosed by dashed boxes, such as 1632, 1634, 1635, 1636, 1637, 1638, and 1639, and are connected to associated nodes by dashed arrows. FIG. 1B shows the internal tree structure for the sample XL document shown in FIG. 10B. The oval boxes such as 1650, 1652, and 1654 denote the elements, and the square boxes such as 1656 and 1658 denote the actual contents.

A. The Procedure

Our solution traverses both the DTDSA graph and the XML document tree simultaneously from their corresponding root nodes. The DTDSA graph is traversed in a top-down fashion, using the corresponding XML tree traversal path or trace as references or guides for:

counting number of occurrences actually included in the current XML sub-tree, for '*', '+', and '?';
determining which choice list element is taken;
receiving data from XML leaf nodes and attributes, which are absorbed by the value annotations associated with the DTDSA leaf nodes (#PCDATA and CDATA).

Binding annotations in the DTDSA graph serve as rows, records, or place holders, whose individual columns can be filled with real values from the XML tree leaf nodes via value annotations. The number of rows or records that need to be generated depends on the number of corresponding XML sub-trees. A place holder or empty row will be allocated when (1) the traversal reaches a DTDSA node X; (2) X has an associated binding annotation; and (3) the traversal is about to visit X's descendant nodes. Values within scope of X will be added into the the corresponding column in the row. The traversal continues either backward to X's parent node, or forward again due to the repetition symbols and there are multiple instances of X according to the XML tree.

The SQL select statements are created and executed during the top-down forward direction for the XML document retrieval process, but the SQL insert, update, and delete statements are created and executed during the backward direction for the deposit process.

When any row or record is completely collected, the following steps are performed to ensure that the row or record is correctly stored into the corresponding data source:

(i) Meta data check: issue error if primary key or any non-null column does not have a value. The process may abort with error messages, or accept default (or user provided) values for all the empty fields.
(ii) Foreign key relationship or referential integrity check: database schema induced JOIN, can be checked statically, and solved by performing batch insert, update, and delete statements, similar to the standard view update solution. The process can abort if referential integrity is compromised.
(iii) Create SQL statement, such as insert, update, or delete, based on user options.
(iv) Execute the SQL statement.
(v) Run-time duplicated primary key for the insert statement check: if the inserted row has a primary key that is already in the table, the program may either accept user option to create/execute update statement, or abort.

Figure 11B:
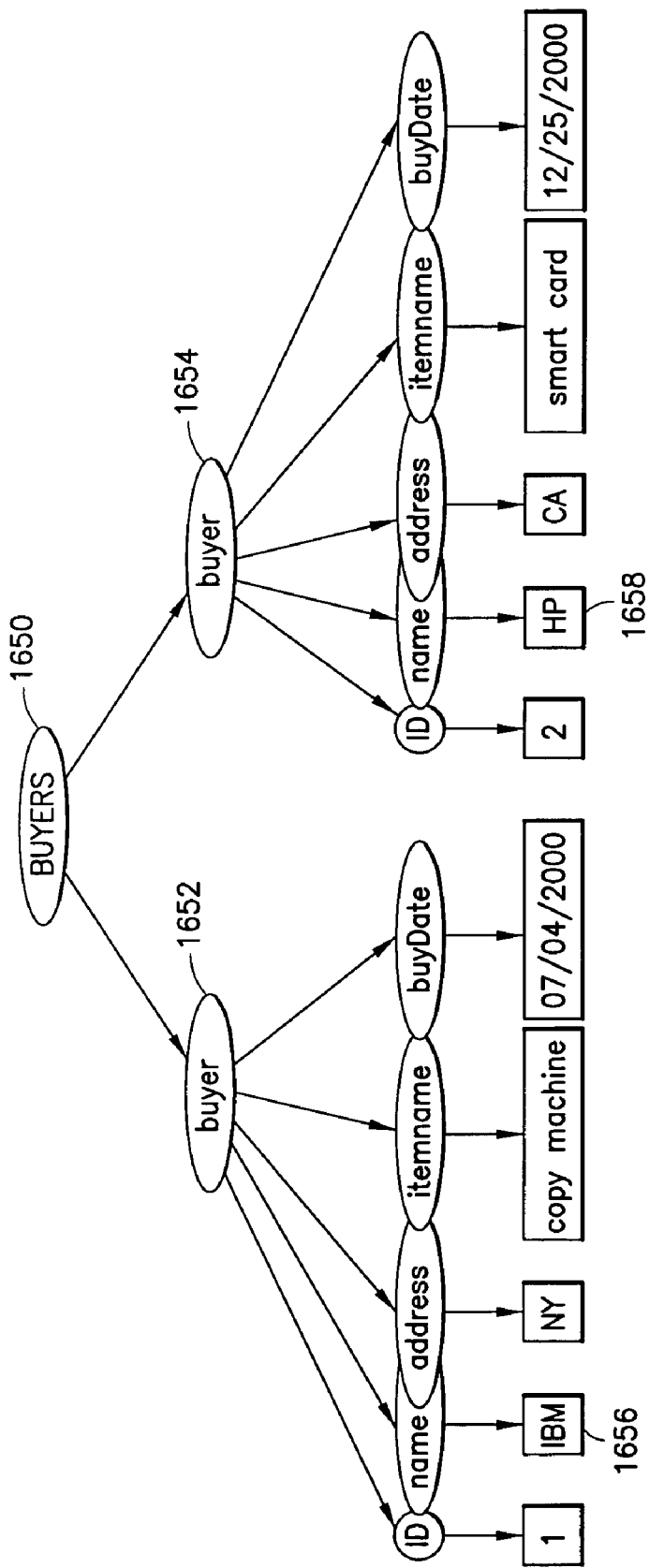
FIG. 11B depicts the internal tree structure or graph for the sample XML shown in FIG. 10B.

For example, FIG. 1A includes an SEQ node (1620) with a repetition symbol '*' (1630) and a binding annotation r:=row(buyers) (1632), and FIG. 11B includes two buyer child nodes (1652 and 1654) of the BUYERS node (1650). Therefore, the descendant nodes of the SEQ node at 1620 will be traversed twice, collecting two records or rows for the buyers table.

Figure 12A:
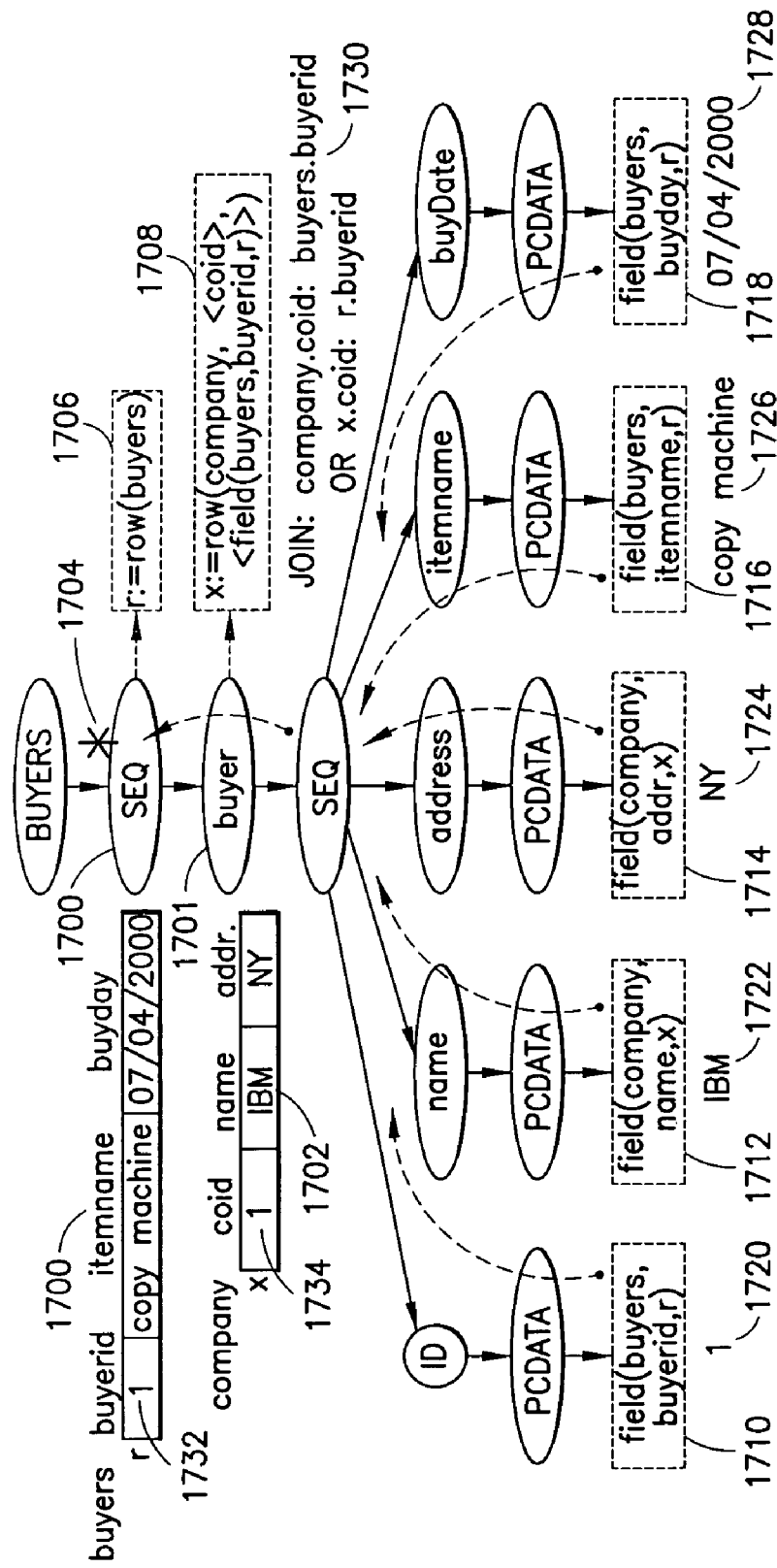
FIG. 12A shows the records or rows that are collected after the first round of traversal.

FIG. 12A shows the records or rows that are collected after the first round of traversal over the descendant nodes of the SEQ node at 1700, with a '*' at 1704 and an annotation at 1706. During the forward stage of the traversal two records or rows for the two tables, buyers (1700) and company (1702), are collected, due to the binding annotations at 1706 and 1708 that are associated with the SEQ node at 1700 and the buyer node at 1701 respectively. Variable r relates to the buyers table and x relates to the company table. When the forward traversal reaches the leaf #PCDATA nodes with respective value annotations at 1710, 1712, 1714, 1716, and 1718, the corresponding values, "1" (1720), "IBM" (1722), "NY" (1724), "copy machine" (1726), and "07/04/2000" (1728) for elements ID, name, address, itemname, and buyDate, are fetched from the XML tree at FIG. 1B, and stored into relevant tables. For instance, the value "1" at 1720 relates to r, and is stored to the buyerid column in the buyers table, due to the value annotation field(buyers,buyerid,r) at 1710, while the value "IBM" at 1722 relates to x and is stored to the name column in the company table, due to the value annotation field(company,name,x) at 1712.

Figure 12B:
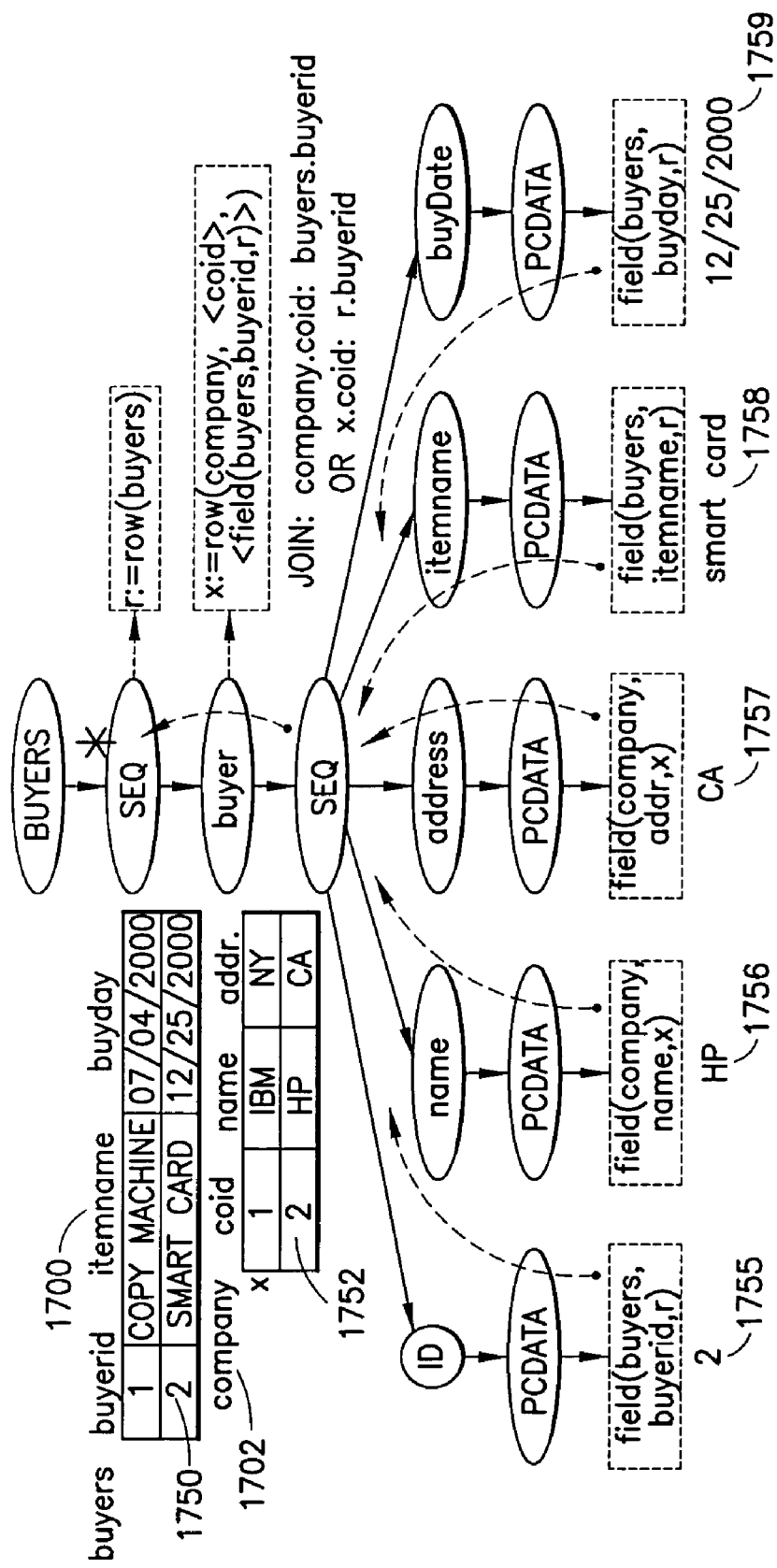
FIG. 12B shows the records or rows that are collected after the second round of traversal.

The dotted curve arrows represent the backward stage of the traversal, and related content collection. After it finishes the first iteration, the deposit process has collected one row of columns buyerid, itemname, and buyday for the buyers table, and one row of columns coid, name, and addr for the company table. FIG. 12B shows the records or trows that are collected after the second round of traversal for the '*'. The values "2" (1755), "HP" (1756), "CA" (1757), "smart card" (1758), and "12/25/2000" (1759) are collected and propagated into the second rows of the buyers table (1700) and the company table (1702) respectively at 1750 and 1752.

Value propagation may need to be done to complete the rows or records. For instance, the value "1" at 1732 in the buyers table at 1700 is collected from the value at 1720 and the annotation at 1710. The value should be propagated to the coid column at 1734 in the company table at 1702, due to that the binding annotation at 1708 defines a join relation between the company table coid column and the buyers table buyerid column (1730).

B. Join Union

The binding annotations in the DTDSA may introduce join conditions that can form complicated join unions. When any of the column names in the union receives its value from XML content, all of the other columns should accept the same value. Proper value propagation should be performed during the traversal of the DTDSA graph and the XML tree.

Figure 13:
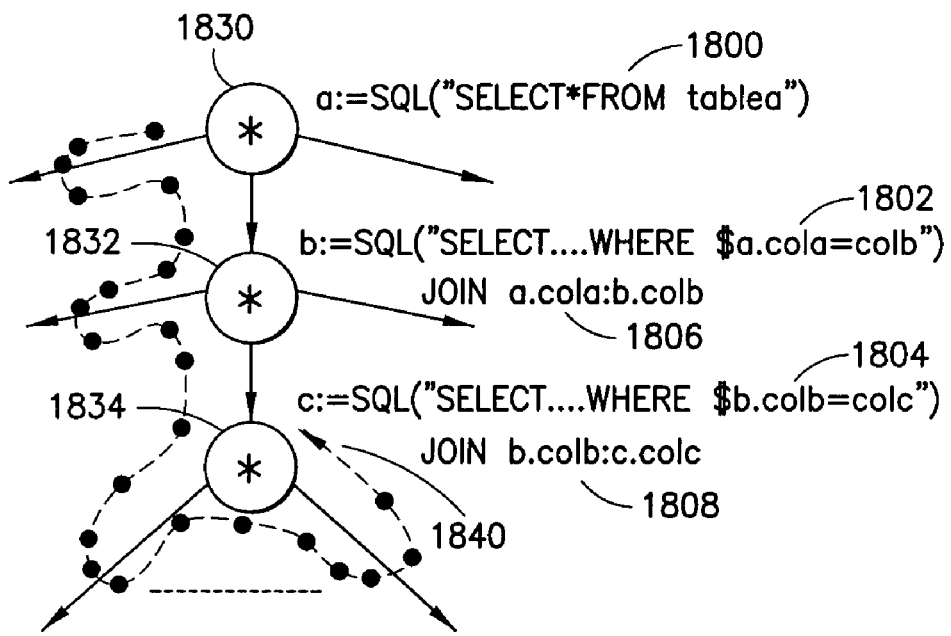
FIG. 13 illustrates a join union formed by some of the binding annotations.

FIG. 13 illustrates a join union formed by a.cola, b.colb, and c.colc due to the three binding annotations at 1800, 1802, and 1804. For every row associated with a, its a.cola value must match its join b.colb (through 1806) and c.colc (through 1808) for all of its descendants. If none of the columns in the union receive a value from the XML tree during the traversal, the process may either abort or request user input. If the columns in the union receive more than one distinct value, the process should abort due to the inconsistent join condition. The dotted curve arrow shows the trace of the traversal. The scopes of a.cola, b.colb, and c.colc cover all descendant nodes of the nodes at 1830, 1832, and 1834 respectively. If the traversal reaches the node at 1834 and there is no a.cola, b.colb, or c.colc occurred yet as shown by the dotted arrow head at 1840, then the row for c is not complete, and need to wait for either a.cola or b.colb, along the way back to the nodes at 1832 and 1830.

C. Static DTDSA Reversibility Check

Figure 14:
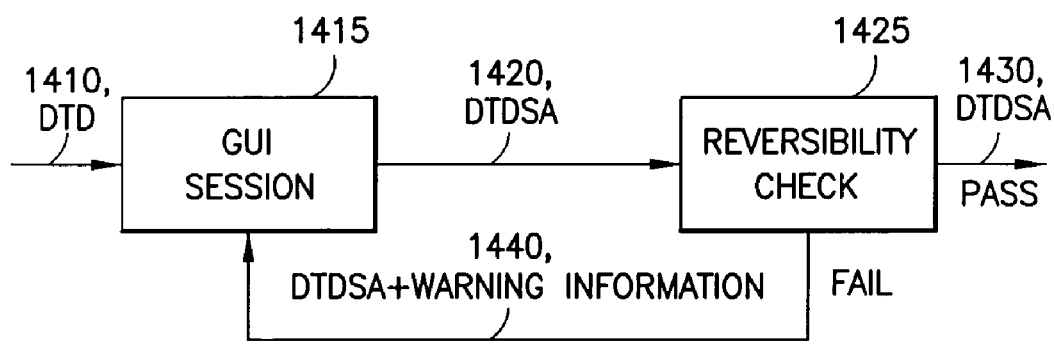
FIG. 14 shows the repetitive annotation sessions that include a reversibility check.

Alternatively, we can have a static check about whether a given DTDSA can be used for depositing from real documents. It is possible to examine the binding and value annotations in the DTDSA for new collectible rows that do not have required fields (primary key and non-null columns) or violate the foreign key relationship with other tables. Such a reversibility check can be part of the GUI annotation session to ensure a reversible DTDSA FIG. 14 shows the repetitive annotation sessions that include a reversibility check. The GUI session at 1415 is similar to the GUI session at 415, and can accept and annotate the original DTD (1410). The generated DTDSA (1420) is verified by the reversibility check (1425). If the DTDSA satisfies all of the conditions, the process delivers the final DTDSA (1430). Otherwise, the irreversible DTDSA and warning information (1440) are sent back to the GUI session at 1415 for further annotation and modification.

The preferred approach is a bottom-up approach that starts at the value annotations of the leaf elements. Required column information is collected and propagated upward to ancestors. For an SEQ ancestor node, sets of column information from all of its child nodes are merged into a set. For a CHOICE ancestor node, a collection of sets is created where column information from each of its child node is itself a set. The number of sets in the collection may grow exponentially since column information from all possible paths must be considered, and to merge or combine collections of sets involves a multiply operation.

When the upward propagation reaches a node with a binding annotation that defines a variable x, the static check examines if the sets of columns involving x satisfy the meta data constraint in that all primary key and non-null columns are present. This applies to every set in the collection of sets. The upward propagation continues after removing all of the sets that involve x from the collection.

For example, in FIG. 11A, when the upward propagation reaches the node at 1603 with a binding annotation at 1634, the collection includes a single set {r.buyerid (1635), x.name (1636), x.addr (1637), r.itemname (1638), r.buyday (1639)} since no CHOICE nodes are encountered. Due to the join condition at 1634, x.coid r.buyerid, and r.buyerid is in the set, x.coid can be added into the set. Now all columns involving x are removed from the set and checked against the meta data of the company table for primary key and non-null columns. If r.buyerid is not in the set, it is added into the set with a special marker. Any use of r.buyerid from any branch can unmask it. When the upward propagation reaches the nodes that define r, and any set in the collection includes the marked r.buyerid, information for the join columns are not defined. If the marked r.buyerid column is involved in a join condition again with an ancestor column, say y.col, the propagation action should remove the marked r.buyerid from all of the sets in the collection, and adds the marked y.col to all of the sets that do not include y.col.

From reading the present disclosure, other modifications will be apparent to persons skilled in the art. Such modifications may involve other features which are already known in the design and use of data conversion techniques and XML and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

We claim:

1. A method for creating an electronic communication, comprising executing the following operations in at least one data processing device:

first retrieving data from at least one type of data source into a first electronic format using at least one first annotated schema;

second retrieving data from the first electronic format into a second electronic format using at least one second annotated schema, further comprising using a GUI tool to create internal representations relating the second format to the at least one type of data source wherein the GUI tool can systematically organize a template from combining and merging multiple tables is adapted to enable operations, the operations including accepting single annotations for certain repeatable constructs in the template, and replicating the repeatable constructs a fixed number of times for customized annotation.

2. The method of claim 1, wherein the first electronic format comprises at least one XML document.

3. The method of claim 1, wherein the first electronic format comprises at least one value pair.

4. The method of claim 1, wherein the first and second retrieving are done using a same type of software engine applied first to the at least one type of data source and then to the first electronic format.

5. The method of claim 1, wherein the second electronic format belongs to the category of XML/EDI electronic document specification languages.

6. The method of claim 1, wherein the first annotated schema comprises at least one first annotated DTD and the second annotated schema comprises at least one second annotated DTD.

7. The method of claim 6, wherein the at least one second annotated schema comprises a single DTD for all possible document types within a single industrial electronic document specification language; and annotations for retrieving specifications for a desired document type from the first electronic format.

8. The method of claim 7, wherein the first and second retrieving are done using a same type of software engine applied first to the at least one type of data source and then to the first electronic format.

9. The method of claim 1, wherein the at least one type of data source comprises heterogeneous data bases.

10. The method of claim 1, wherein each schema describes a structure of a target format and each annotation relates to a structure of a source format, so that each annotated schema guarantees that the retrieving steps create data that conforms to the target format, without additional checking.

11. The method of claim 1, wherein the annotations are inserted into the respective schema.

12. At least one data processing device comprising:
   at least one memory for storing code and data;
   at least one processor for performing the following operations using the least one memory
   first retrieving data from at least one type of data source into a first electronic format using at least one first annotated schema;
   second retrieving data from the first electronic format into a second electronic format using at least one second annotated schema; and
   creating an electronic communication based on the at least one second annotated schema further comprising using a GUI tool to create internal representations relating the second format to the at least one type of data source; wherein the GUI tool
      can systematically organize a template from combining and merging multiple tables:
      is adapted to enable operations, the operations including:
         accepting single annotations for certain repeatable constructs in the template, and
         replicating the repeatable constructs a fixed number of times for customized annotation.

13. The device of claim 12, wherein the first electronic format comprises at least one XML document.

14. The device of claim 12, wherein the first electronic format comprises at least one value pair.

15. The device of claim 12, wherein the first and second retrieving are done using a same type of software engine applied first to the at least one type of data source and then to the first electronic format.

16. The device of claim 12, wherein the second electronic format belongs to the category of XML/EDI electronic document specification languages.

17. The device of claim 12, wherein the first annotated schema comprises at least one first annotated DTD and the second annotated schema comprises at least one second annotated DTD.

18. The device of claim 17, wherein the at least one second annotated schema comprises
   a single DTD for all possible document types within a single industrial electronic document specification language; and
   annotations for retrieving specifications for a desired document type from the first electronic format.

19. The device of claim 18, wherein the first and second retrieving are done using a same type of software engine applied first to the data sources and then to the first electronic format.

20. The device of claim 12, wherein the at least one type of data source comprises heterogeneous relational databases.

21. The device of claim 12, wherein each schema describes a structure of a target format and each annotation relates to a structure of a source format, so that each annotated schema guarantees that the retrieving steps create data that conforms to the target format, without additional checking.

22. The device of claim 12, wherein each annotated schema comprises a schema with inserted annotations.

23. A medium readable by a data processing device and embodying code for performing the following operations:
   first retrieving data from at least one type of data source into a first electronic format using at least one first annotated schema;
   second retrieving data from the first electronic format into a second electronic format using at least one second annotated schema; and
   creating an electronic communication based on the at least one second annotated schema further comprising using a GUI tool to create internal representations relating the second format to the at least one type of data source, wherein the GUI tool
   can systematically organize a template from combining and merging multiple tables,
   is adapted to enable operations, the operation including
      accepting single annotations for certain repeatable constructs in the template, and
      replicatinge the repeatable constructs a fixed number of times for customized annotation.

24. The medium of claim 23, wherein the first electronic format comprises at least one XML document.

25. The medium of claim 23, wherein the first electronic format comprises at least one value pair.

26. The medium of claim 23, wherein the first and second retrieving are done using a same type of software engine applied first to the at least one type of data source and then to the first electronic format.

27. The medium of claim 23, wherein the second electronic format belongs to the category of XML/EDI electronic document specification languages.

28. The medium of claim 23, wherein the first annotated schema comprises at least one first annotated DTD and the second annotated schema comprises at least one second annotated DTD.

29. The medium of claim 28, wherein the at least one second annotated schema comprises
   a single DTD for all possible document types within a single industrial electronic document specification language; and
   annotations for retrieving specifications for a desired document type from the first electronic format.

30. The medium of claim 29, wherein the first and second retrieving are done using a same type of software engine applied first to the at least one type of data source and then to the first electronic format.

31. The medium of claim 23, wherein the at least one type of data source comprises heterogeneous relational databases.

32. The medium of claim 23, wherein each schema describes a structure of a target format and each annotation relates to a structure of a source format, so that each annotated schema guarantees that the retrieving steps create data that conforms to the target format, without additional checking.

33. The medium of claim 23, wherein each annotated schema comprises a schema with inserted annotations.

* * * * *